(12) United States Patent
Yussouff

(10) Patent No.: US 11,551,115 B2
(45) Date of Patent: Jan. 10, 2023

(54) SYSTEMS AND METHODS UTILIZING MACHINE LEARNING TECHNIQUES TO MANAGE CONTENT IN STANDALONE MULTI-TENANCY ENVIRONMENTS

(71) Applicant: Ashraf Yussouff, Herndon, VA (US)

(72) Inventor: Ashraf Yussouff, Herndon, VA (US)

( * ) Notice: Subject to any disclaimer, the term of this patent is extended or adjusted under 35 U.S.C. 154(b) by 494 days.

(21) Appl. No.: 16/717,018

(22) Filed: Dec. 17, 2019

(65) Prior Publication Data

US 2020/0202239 A1 Jun. 25, 2020

Related U.S. Application Data

(60) Provisional application No. 62/783,505, filed on Dec. 21, 2018.

(51) Int. Cl.

| | |
|---|---|
| *G06Q 30/00* | (2012.01) |
| *G06N 5/04* | (2006.01) |
| *G06N 20/00* | (2019.01) |
| *G06Q 30/02* | (2012.01) |

(52) U.S. Cl.
CPC .............. *G06N 5/04* (2013.01); *G06N 20/00* (2019.01); *G06Q 30/0264* (2013.01); *G06Q 30/0267* (2013.01); *G06Q 30/0269* (2013.01); *G06Q 30/0271* (2013.01)

(58) Field of Classification Search
CPC ................. G06Q 30/06; G06Q 30/0207–0277
See application file for complete search history.

(56) References Cited

U.S. PATENT DOCUMENTS

| | | | | |
|---|---|---|---|---|
| 8,170,535 | B1* | 5/2012 | Lopes | H04L 65/61 455/414.3 |
| 2013/0179201 | A1* | 7/2013 | Fuerstenberg | G06Q 30/0255 705/5 |
| 2014/0156396 | A1* | 6/2014 | deKozan | G06Q 30/0255 705/14.53 |
| 2015/0031400 | A1* | 1/2015 | Tian | H04W 4/18 455/456.3 |
| 2015/0254720 | A1* | 9/2015 | Newberg | G06Q 30/0267 705/14.63 |
| 2015/0262006 | A1* | 9/2015 | Yomogida | G06Q 30/0272 705/14.62 |
| 2016/0253710 | A1* | 9/2016 | Publicover | H04N 21/2187 705/14.66 |

(Continued)

FOREIGN PATENT DOCUMENTS

WO   WO-2008037899 A2 *  4/2008   ............. G06Q 30/02

*Primary Examiner* — Luis A Brown
(74) *Attorney, Agent, or Firm* — Ansari Katiraei LLP; Sadiq Ansari

(57) ABSTRACT

A system described herein may allow for the intelligent, dynamic selection of an active tenant for a standalone, multi-tenant environment, such as a multi-operator bus or other vehicle. Intelligent selection may be performed using machine learning and/or other suitable techniques, which may be based on similarity to previous usage by a registered tenant, and may further include analyzing structured and/or unstructured data regarding the environment. In addition, the system may allow different profiles, content, or content templates to be associated with different tenants, thus granting a high level of dynamic flexibility in tailoring the content and/or services provided to the users of the environment based on the selected tenant.

16 Claims, 19 Drawing Sheets

(56) References Cited

U.S. PATENT DOCUMENTS

| | | | | |
|---|---|---|---|---|
| 2017/0262923 A1* | 9/2017 | Bute | ........................ | H04W 4/23 |
| 2018/0048722 A1* | 2/2018 | Fadeev | .................... | H04L 67/53 |
| 2018/0324120 A1* | 11/2018 | Smullen | ................... | H04L 67/02 |
| 2019/0279069 A1* | 9/2019 | Bastide | ................... | G16H 20/10 |
| 2019/0325541 A1* | 10/2019 | Simpson | ............... | G06Q 50/205 |
| 2019/0373297 A1* | 12/2019 | Sarkhel | ................ | G06K 9/6267 |
| 2020/0103244 A1* | 4/2020 | Cella | .................... | A61B 5/6893 |
| 2020/0202239 A1* | 6/2020 | Yussouff | ............ | G06Q 30/0202 |
| 2020/0236427 A1* | 7/2020 | Nagar | .............. | H04N 21/44218 |
| 2021/0049920 A1* | 2/2021 | Barth | .................... | G06F 40/284 |
| 2021/0056458 A1* | 2/2021 | Savova | .................. | G06N 20/00 |
| 2021/0224934 A1* | 7/2021 | Williams | ............... | G06N 20/00 |

* cited by examiner

Operation Schedule

| Tenant | Route # | Departure | Arrival | From | To |
|---|---|---|---|---|---|
| Tenant_A | 4158 | 0500 | 0800 | Location_A | Location_1 |
| Tenant_B | 346 | 0600 | 0900 | Location_B | Location_2 |
| Tenant_A | 4120 | 0700 | 0900 | Location_A | Location_3 |
| Tenant_B | 6453 | 0800 | 1130 | Location_B | Location_2 |
| Tenant_C | 5123 | 1200 | 2000 | Location_C | Location_3 |
| Tenant_A | 4162 | 1800 | 2100 | Location_A | Location_1 |
| Tenant_A | 4168 | 2300 | 0230 | Location_A | Location_4 |
| Tenant_B | 303 | 2300 | 0900 | Location_C | Location_3 |

Bus #555

| Route # | Departure | Arrival | From | To | Tenant |
|---|---|---|---|---|---|
| 4158 | 0500 | 0800 | Location_A | Location_1 | |
| 4157 | 0900 | 1200 | Location_1 | Location_A | |
| 5123 | 1300 | 2000 | Location_C | Location_3 | |
| 5124 | 2100 | 0400 | Location_3 | Location_C | |

FIG. 4B

Bus #555

| Route # | Departure | Arrival | From | To | Tenant |
|---|---|---|---|---|---|
| 4158 | 0500 | 0800 | Location_A | Location_1 | Tenant_A |
| 4157 | 0900 | 1200 | Location_1 | Location_A | Tenant_A |
| 5123 | 1300 | 2000 | Location_C | Location_3 | Tenant_B |
| 5124 | 2100 | 0400 | Location_3 | Location_C | Tenant_B |

| Day | Bus #555 - Schedule | | Bus #556 - Schedule | |
| --- | --- | --- | --- | --- |
| | Tenant #1 | Tenant #2 | Tenant #1 | Tenant #2 |
| Monday | Tenant_A | Tenant_B | | |
| Tuesday | Tenant_A | | Tenant_B | |
| Wednesday | Tenant_A | Tenant_B | | |
| Thursday | Tenant_A | | Tenant_B | |
| Friday | Tenant_A | Tenant_B | | |
| Saturday | MAINT | MAINT | Tenant_B | |
| Sunday | | | MAINT | MAINT |

FIG. 5A

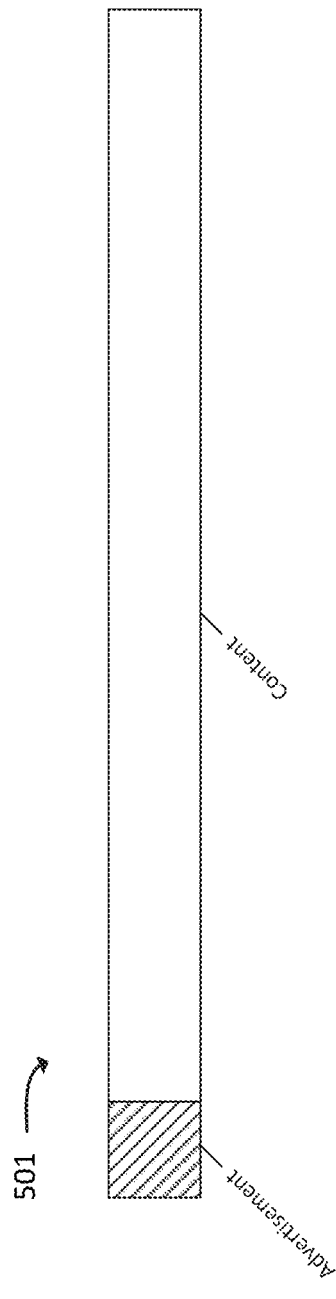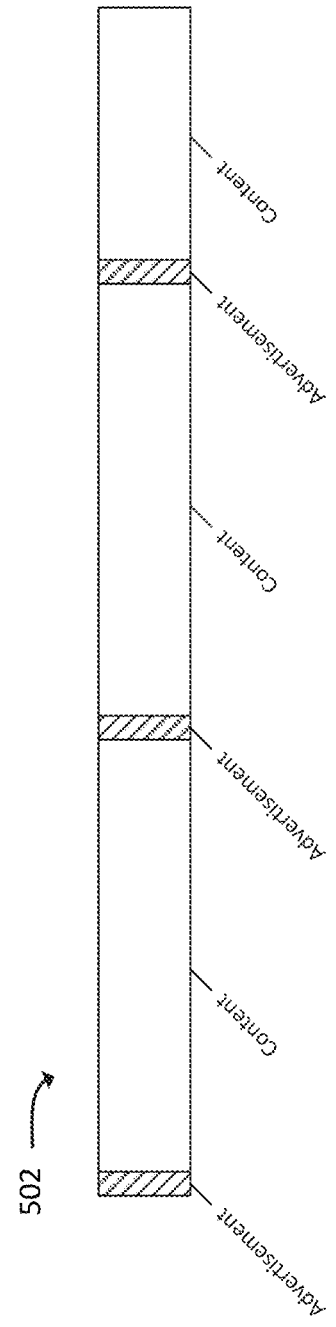
FIG. 8A
FIG. 8B

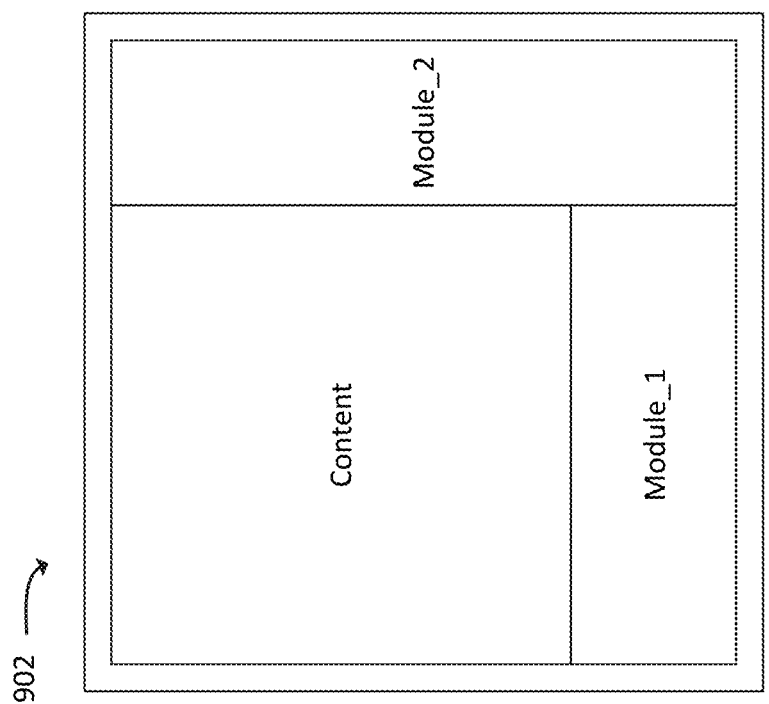

SYSTEMS AND METHODS UTILIZING MACHINE LEARNING TECHNIQUES TO MANAGE CONTENT IN STANDALONE MULTI-TENANCY ENVIRONMENTS

CROSS-REFERENCE TO RELATED APPLICATION

This Application claims the benefit of U.S. Provisional Patent Application No. 62/783,505, filed on Dec. 21, 2018, the contents of which are herein incorporated by reference in their entirety.

BACKGROUND

Multi-tenancy allows multiple tenants to operate within the same environment. The tenants may share certain elements of the environment but may maintain separate equipment to manage different content. For example, different tenants may provide transportation services (e.g., busing services) utilizing the same infrastructure. For instance, one tenant may operate a bus on one day, while another tenant may operate the same bus on a different day. The different tenants may wish to provide different content (e.g., streaming movies, television shows, etc.) via infotainment systems that are integrated within the bus.

BRIEF DESCRIPTION OF THE DRAWINGS

FIG. 3B illustrates an example operating schedule determined by a content control component based on unstructured data, in accordance with some embodiments described herein;

FIGS. 4A and 4B illustrate the ability for a content control component to determine a tenant selection schedule for the content delivery system based on unstructured data (e.g., using machine learning techniques), in accordance with some embodiments described herein;

FIGS. 5A and 5B illustrate the ability for a content control component to modify a schedule based on determining an abnormal schedule, in accordance with some embodiments described herein;

FIGS. 8A-8D illustrate example arrangements of tenant-specified content distributed in conjunction with (e.g., interjected in) content, where different tenants may be associated with different arrangements of tenant-specified content, in accordance with some embodiments described herein;

FIGS. 9A and 9B illustrate examples of different user interfaces, associated with different tenants, in which content may be provided based on tenant profile information, in accordance with some embodiments described herein;

DETAILED DESCRIPTION OF THE PREFERRED EMBODIMENTS

Figure 1:
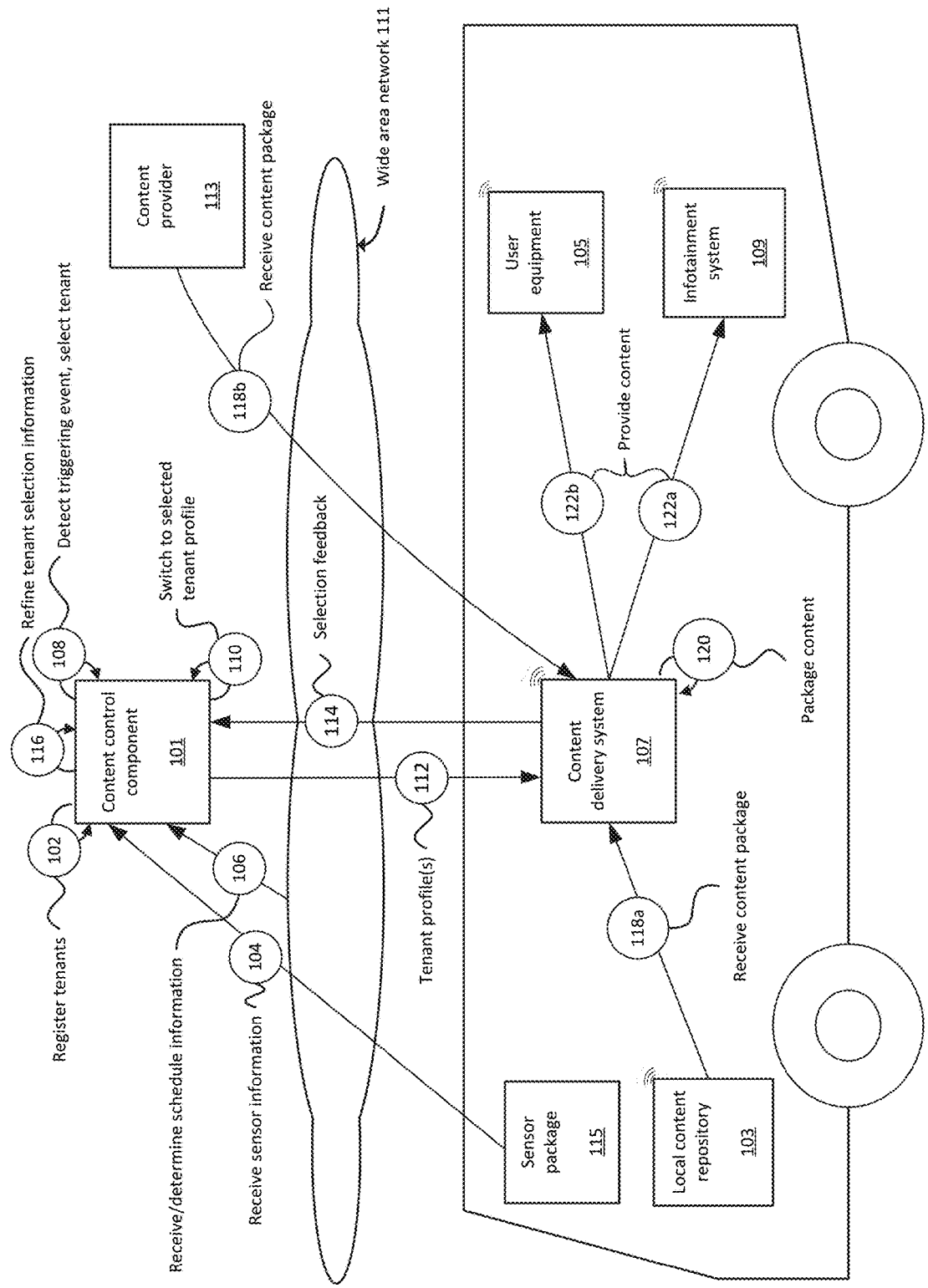
FIG. 1 illustrates an example overview of one or more embodiments, described herein, in which a content control component intelligently selects a tenant in a multi-tenancy environment, causing content associated with the selected tenant to be delivered via User Equipment ("UE") and/or an infotainment system associated with the multi-tenancy environment.

The following detailed description refers to the accompanying drawings. The same reference numbers in different drawings may identify the same or similar elements.

Embodiments described herein provide for providing content based on determining what resources and/or services a tenant may access in a multi-tenant environment. The tenants in the multi-tenant environment may utilize only one, common (e.g., shared) set of resources and/or services but present/deliver these resources and/or services or subsets thereof to the end-consumer in a differentiated manner specific to each tenant. In some embodiments, active tenancy may be switched manually (e.g., a tenant and/or other entity may manually indicate a particular tenant, and accordingly may indicate particular content to provide in the environment). In some embodiments, active tenancy may be switched in an automated process. For example, some embodiments may use machine learning, artificial intelligence ("AI"), and/or other suitable techniques to identify and analyze structured and/or unstructured data, and switch active tenancy in the multi-tenancy environment in an automated process.

Some embodiments described herein allow multiple service operators (e.g., operating tenants) to operate within the same standalone environment using the same service delivery equipment and infrastructure while offering differentiated service to their consumers. The system is able to select the appropriate operating tenant for the environment automatically and dynamically based on machine learning and/or other suitable techniques. The system's machine learning models, algorithms, etc., may utilize operating factors (e.g., time, geo-location, etc.), consumer-operator relationships, manually provided settings, and/or other suitable information as input. Upon dynamic activation of the selected tenant, the system may present/deliver the differentiated service offering specific to that tenant, including partially or completely blocking system access to users in the environment.

Resources, which may include user content and/or tenant-specified content, may be automatically provided and/or offered to devices in the multi-tenancy environment, such as one or more edge routers, content delivery caches, User Equipment ("UE") such as mobile telephones or tablet computers, infotainment systems (e.g., integrated in a vehicle, such as a bus, airplane, etc.), or the like. "User content" may refer to content such as movies, television shows, games, digital books, digital magazines, etc. User content may include streaming content (e.g., as received from a content provider via the Internet) and/or locally cached or stored content (e.g., movie, music, or magazine files stored at a local storage device). Tenant-specified content may include branding, advertising content, weather information, route information (e.g., status of a transit route, such as a bus route in the example where the multi-tenancy environment includes a bus), payment processing services, embedded user screens, location-based services (e.g., tour guide applications, etc.), connectivity options or settings (e.g., settings for a Wireless Local Area Network ("WLAN"), settings for one or more Bluetooth™ devices, etc.), and/or other content specified by tenants in the multi-tenancy environment.

In some embodiments, a content control component ("CCC") may include one or more web-based resources (e.g., a cloud computing system and/or some other type of device or system) that may communicate with one or more content delivery systems associated with one or more multi-tenancy environments. For example, as described below, the CCC may intelligently (e.g., using machine learning, AI, and/or other suitable techniques) determine a particular active tenant for a given multi-tenancy environment, and may instruct the content delivery systems to deliver content and/or configure one or more aspects of the multi-tenancy environment based on the identified active tenant.

As shown in FIG. 1, for example, CCC 101 may register (at 102) information regarding a set of tenants. As described, multiple tenants may operate within the same environment and may utilize the same resources and/or services, but with different preferences and/or access. Registration may include maintaining (e.g., creating, updating, etc.) a tenant profile based on received information. For example, a tenant profile may contain information such as an identifier, a list of content and/or resources each particular tenant may utilize, preferences, contact information, and/or other details regarding each particular tenant. As described in greater detail below, the tenant profile may specify customizations to what user content is offered to users, customizations to the user content (e.g., tenant-specified content inserted in, overlaid over, presented with, etc., the user content), branding (e.g., look and feel, colors, logos, etc.), and/or other tenant-specific customizations or settings.

The registration information (e.g., the tenant profile) may be received (e.g., from a computing device associated with one or more tenants) via Wide Area Network ("WAN") 111, such as the Internet. In some embodiments, the registration information may be provided by a non-transitory storage medium (e.g., a Universal Serial Bus ("USB") storage drive, etc.) inserted in CCC 101 and/or a device communicatively coupled with CCC 101.

As further illustrated in FIG. 1, CCC 101 may receive (at 104) sensor information. Sensor information may include, for example, location information (e.g., Global Positioning Satellite ("GPS") information, location based on a proximate wireless network (e.g., determined by connection to Wi-Fi™ network, radio-frequency identification ("RFID") signal, etc.), wireless telecommunication signal (e.g., cellular triangulation, etc.), etc.), route information (e.g., in environments where a specific route may be associated with one tenant), timing data (e.g., in environments where a tenant operates in a certain time period), cargo information (e.g., what type of cargo is loaded, etc.), video information (e.g., where the sensor includes a camera), photographic information, vehicle operation information (e.g., an onboard diagnostics ("OBD") device, such as an OBD-II device, which may indicate information such as how long an engine has been turned on, whether the engine is operating and/or idling, etc.), and/or other sensor information. CCC 101 may receive sensor information from one or more devices (e.g., sensor package 115) via WAN 111.

As further illustrated in FIG. 1, CCC 101 may receive and/or determine (at 106) schedule information. CCC 101 may obtain structured data (e.g., a bus schedule, etc.) and/or unstructured data (e.g., data determined by techniques such as natural language processing ("NLP"), etc.) from one or more sources. In some embodiments, CCC 101 may determine schedule information based on machine learning techniques. For example, as further described below, CCC 101 may parse a data source (e.g., by crawling a webpage, etc.) utilizing NLP (e.g., determining schedule information (e.g., time, date, location, etc.) based on phrase and/or word relationships (e.g., determining that a departure location follows a phrase such as "we depart from," etc.). As further described below, CCC 101 may determine a schedule based on a modification of another environment schedule. For example, a bus may determine a schedule based on a change in another bus schedule (e.g., if a bus maintenance schedule is modified, another bus may switch maintenance periods with the bus, etc.).

As further illustrated in FIG. 1, CCC 101 may select (at 108) a tenant. CCC 101 may utilize machine learning techniques to determine a tenant. For example, CCC 101 may score (e.g., on a numerical scale, percentage scale, etc.) predictive models associated with each registered tenant (e.g., tenants previously registered at 102) to the sensor (e.g., from 104) and/or schedule (e.g., from 106) information. Predictive models may contain, for example, information regarding how the tenant associated with the predictive model previously used the environment such as timing data, location data, and/or other data regarding usage. A score indicating higher similarity (e.g., a higher similarity score between given sensor data and the sensor data associated with a predictive model associated with a given tenant) may indicate that one or more pieces of sensor and/or schedule information are similar to the predictive models.

More data in the predictive model may improve the reliability, confidence, and/or robustness of the predictive model. For example, CCC 101 may provide a higher similarity score between a given set of sensor data and a predictive model containing a relatively large amount of information, than to a given set of sensor data and a predictive model containing less information. As described below, CCC 101 may maintain predictive models for a particular tenant based on sensor and/or schedule information received at each use of the environment by the particular tenant. Further, feedback may be used to refine or reinforce the predictive model. For example, as described below, if a particular tenant is automatically selected based on a predictive model and is quickly (e.g., within 30 seconds, within 5 minutes, within one hour, before arriving at a transportation hub, and/or based on some other criteria) manually changed to another tenant, the predictive model may be altered or refined, to reflect that the set of sensor data based on which the particular tenant was selected should not actually be used to predict the tenancy of the particular tenant. If, on the other hand, a tenant is automatically selected (in accordance with some embodiments) and the selection is maintained (e.g., is not manually changed within a threshold period of time, and/or is left in effect for the duration of a trip or route), then the predictive model may be altered or refined, to reflect that the set of sensor data based on which the particular tenant was selected should continue to be used to predict the tenancy of the particular tenant.

In some embodiments, CCC 101 may score multiple candidate tenants upon a triggering event, and may select a particular tenant based on similarity scores between the predictive model for each tenant and a set of contextual and/or sensor data at a time corresponding to the triggering event. Generally speaking, a "triggering event" may be an event at which the tenancy should be switched from one tenant to another, such as the end of a particular trip or route, the beginning of a trip or route, availability of a maintenance or update package, and/or some other type of event. An event may be determined based on, for example, the arrival or departure from a geographical location corresponding to a transportation hub (e.g., a bus depot, a train station, an airport, a taxi line, etc.). Additionally, or alternatively, the event may be determined based on vehicle data, indicating that a vehicle (e.g., a bus, taxi, etc.) has started or stopped its engine, and/or has started or stopped moving. As another example, the event may be based on an operating schedule, which may be automatically determined (e.g., using machine learning, NLP, etc.) and/or may be explicitly provided. The quantity and/or type of events that signify a triggering event may be continually refined using machine learning and/or other techniques. For example, if a tenancy is switched based on a potential triggering event, and is reverted back to a previous tenant, this may indicate that the tenancy was switched erroneously, and the triggering event was therefore a false triggering event (i.e., the sensor data and/or other data, based on which the triggering event was identified, should not be used to determine the occurrence of the triggering event).

Further, triggering events may have different types, which may have different resulting actions. For example, assume that a first triggering event is the arrival of a particular bus at a particular bus station during the day (e.g., before 5:00 PM). In this situation, CCC 101 may determine that the tenancy should be switched from a first tenant (e.g., which was selected for a trip before the bus arrived at the bus station) to a second tenant (e.g., for a subsequent trip) who is associated with daytime commutes. On the other hand, assume that a second triggering event is the arrival of the particular bus at the same particular station during the evening (e.g., between 5:00 PM and 9:00 PM). In this situation, CCC 101 may determine that the tenancy should be switched from the first tenant to a third tenant who is associated with overnight commutes. As yet another example, assume that a third triggering event is the arrival of the particular bus at the same particular station during the nighttime (e.g., between 9:00 PM and 4:00 AM). In this situation, CCC 101 may determine that a maintenance or update should be performed prior to switching tenants for the next day.

For example, CCC 101 may select the tenant associated with the score which is most similar (e.g., higher) to the sensor and/or schedule information. In some embodiments, CCC 101 utilize other criteria (e.g., how recently the tenant utilized the environment, whether the tenant has been selected for this particular environment before (as opposed to other similar environments), etc.) in conjunction with the associated score to select a tenant. In some embodiments, CCC 101 may determine that multiple predictive models have equivalent scores (e.g., determine that a difference between two scores does not exceed a difference threshold) and may utilize additional criteria to select a tenant. For example, if multiple tenants have the same score, CCC 101 may choose one tenant based on most recent usage. In some embodiments, CCC 101 may reject (e.g., not select from) predictive models with scores which do not exceed a particular threshold.

In some embodiments, the determination of which tenant to select may occur responsively and/or in real time (e.g., a tenant may be selected after sensor data is received, based on which the tenant is selected), and/or may occur predictively. For example, CCC 101 may identify (e.g., using machine learning and/or other techniques) that a particular sequence or schedule of tenants should be selected. This may happen when, for example, a relatively set or static rotation of tenants utilize a given resource on a relatively regular basis. In such scenarios, CCC 101 may determine, for example, that a first tenant should be associated with the resource during a first time period (e.g., a time period corresponding to a scheduled route or trip) and/or until a particular triggering event is detected (e.g., until the resource arrives at a particular geographical location, such as a bus depot in a particular city), and that a second tenant should be associated with the resource during a second time period (e.g., a time period corresponding to a scheduled route or trip that occurs after the first route or trip), and/or after the particular triggering event is detected (e.g., after the resource arrives at the particular geographical location). In this sense, a schedule of tenants may be "pre-loaded" and tenants may be switched without further communication from CCC 101.

As further illustrated in FIG. 1, CCC 101 may switch (at 110) to the selected tenant. For example, CCC 101 may retrieve customization information (e.g., graphics, tenant-specific content, user content to offer, and/or other suitable customization information) associated with a tenant. The customization information may be part of the tenant profile (e.g., as received during registration at 102).

As further illustrated in FIG. 1, CCC 101 may provide (at 112) the tenant profile information to content delivery system ("CDS") 107. CDS 107 may be, or may include, an "edge" device or system. Briefly, CDS 107 may communicate with one or more devices in the environment (e.g., one or more UEs 105 and/or infotainment systems 109 integrated in the environment (e.g., display screens in seatbacks or headrests of a bus or other vehicle)) to provide content to UEs 105 and infotainment systems 109. CDS 107 may, for example, provide connectivity (e.g., wireless connectivity) to UEs 105 and/or infotainment systems 109. In some embodiments, CDS 107 may be communicatively coupled with, or may include, Local Content Repository ("LCR") 103, which stores content (e.g., user content and/or tenant-specific content). CDS 107 may, additionally, or alternatively, be communicatively coupled with (e.g., via WAN 111) Content Provider 113, in order to provide web-based (e.g., streaming) content to UEs 105 and/or infotainment system 109.

In some embodiments, CDS 107 may include one or more Domain Name Service ("DNS") and/or other routing capabilities, to handle content requests from UEs 105 and/or infotainment system 109. For example, CDS 107 may first attempt to provide requested content from LCR 103, before obtaining the content from content provider 113 (and/or from some other source).

In some embodiments, CCC 101 may provide the tenant profile to CDS 107 once CCC 101 has selected a current tenant. In some embodiments, CCC 101 may provide multiple tenant profiles to CDS 107, which may be "pre-loaded" by CDS 107 (e.g., in LCR 103), and the information (provided at 112) from CCC 101 may include a reference to, or instruction to provision, a particular one of the pre-loaded tenants. For example, CCC 101 may provision information regarding a first tenant (e.g., a tenant operating a bus on an outbound trip) and a second tenant (e.g., a tenant operating the bus on a return trip). The provisioning of the first and/or second tenants may indicate a start and/or end time for when the first and second tenancies should be effective.

In some embodiments, CDS 107 may receive a tenant selection locally (e.g., not from CCC 101). For example, an owner and/or operator may use a user interface, terminal, etc., associated with CDS 107 (e.g., an onboard computer and/or a UE logged in to an admin interface of CDS 107). The local tenant selection may be provided for situations where CCC 101 cannot reach CDS 107 (e.g., when CDS 107 does not have Internet connectivity), and/or when a tenant selected by CCC 101 should be changed manually (e.g., when the present actual tenant does not match the tenant selected by CCC 101). As discussed herein, CDS 107 may notify CCC 101 when the tenancy is manually changed, in order for CCC 101 to improve or refine the predictive models associated with one or more tenants.

For example, receiving (at 114) selection feedback (such as a selection of a tenant shortly after a tenant is automatically switched by CCC 101) may constitute user-reinforced feedback for the predictive models associated with the tenant that was switched to, and/or the tenant that was switched from. Additionally, or alternatively, CCC 101 may receive affirmative feedback when a tenant is automatically selected by CCC 101. The affirmative feedback may indicate a strong modification in confidence for the predictive models associated with the selected tenant. In contrast, when CCC 101 does not receive user-provided feedback, an inference may be weaker. For example, CCC 101 may receive an indication from a user via a computer that CCC 101 was correct when selecting a tenant associated with the sensor and/or schedule information. Such an affirmation may increase the reliability (e.g., strengthen presumptions) of the predictive model associated with the selected tenant, and/or may reinforce the affinity or correlation between the predictive model and the sensor information and/or other criteria based on which the tenant was selected. Further, the affirmation of the tenant may decrease the affinity or correlation between the predictive models for other tenants and the sensor information and/or other criteria (e.g., this decreased affinity or correlation may indicate that these non-selected tenants were correctly not selected, and should not be selected in future situations with similar sensor information).

In some embodiments, CCC 101 may not receive information from a user, but infer tenant selection information based on non-selection. For example, CCC 101 may determine that, if no tenant selection information (e.g., rejection/ affirmation, alternative tenant, etc.) is received during a scheduled period (e.g., within 30 seconds of selecting a tenant, within five minutes, etc.) and/or before a triggering event (e.g., before a bus in which the tenant is provisioned leaves a bus station, before the bus arrives at a bus station, etc.), that the tenant selection was correct, thus increasing the reliability of the predictive model associated with the selected tenant and/or the selection of the tenant under future similar circumstances (e.g., in situations where sensor readings and/or other criteria are similar to the sensor readings and/or criteria based on which the tenant was selected).

In some embodiments, CCC 101 may regard information regarding tenant information differently depending on when it was received. For example, if CCC 101 receives selection information a short period of time after the start of the operation period for a particular tenant, CCC 101 may determine that the selected tenant was incorrect with a high degree of reliability. However, as the operator is utilizing the environment more in the scheduled time period, there is less reliability that the tenant selection was incorrect. For sake of example, assume CCC 101 has selected Tenant_A for a time period and that CCC 101 receives tenant selection information to switch the environment to Tenant_B near the scheduled end time for Tenant_A. CCC 101 may determine that the tenant selection information is indicative of the selection of the next tenant (Tenant_B) to operate in the environment, rather than provide an indication that Tenant_A (as the current operator) was incorrect. In such a situation, Tenant_A may make a weak inference that Tenant_A was the correct operator and a strong inference that Tenant_B is the correct subsequent operator. Further, CCC 101 may determine that the timing range for the operation of Tenant_A is decreased (e.g., Tenant_A may complete operation earlier than the predictive model may suggest).

As further illustrated in FIG. 1, CCC 101 may refine (at 116) information regarding the predictive models associated with tenants. For example, as described above, CCC 101 may determine different inferences and/or reliabilities of predictive models. CCC 101 may provide information regarding each tenant based on corresponding inferences and/or reliabilities associated with each tenant. As CCC 101 determines more iterations of selection, the information associated with each tenant becomes more accurate (e.g., based on feedback received, or not received, based on tenant selections).

As further illustrated in FIG. 1, CDS 107 may receive (at 118*a* and 118*b*) content/or services. CDS 107 may retrieve the content based on the provided (e.g., from 112) tenant profile information. As illustrated, for example, content may be received (at 118*a*) from LCR 103 and/or may be received (e.g., at 118*b*) from content provider ("CP") 113 via WAN 111. LCR 103 and CDS 107 may be connected as part of a hardwired network and/or a wireless network, and/or may be implemented by the same device or system. As mentioned above, and as described in greater detail below, the content may include user content, tenant-specific content, and/or user content customized based on tenant preferences (e.g., insertion of branding or advertising content in user content).

As further illustrated in FIG. 1, CDS 107 may package (at 120) content and/or services in accordance with the received profile information (e.g., from 112). Content may be packaged according to specific branding preferences (e.g., in a white label environment), according to specific advertisement preferences (e.g., using pre-roll advertisements, interspersing advertisements, advertisements within a module and/or frame, and/or other advertisement preferences), and/ or other preferences. In some embodiments, CDS 107 may provide information to the displaying device to package the content in accordance with tenant preferences (e.g., client-rendered modules, frames, etc.).

CDS 107 may provide (at 122*a* and 122*b*) content to one or more devices in accordance with tenant preferences (e.g., from 112). For example, as shown, a particular tenant may indicate preferences (e.g., from 102) to allow content access through UE 105. As such, CDS 107 may provide (at 118*a*) content via a LAN (e.g., a wireless LAN, hardwired LAN, etc.) to UE 105. In some embodiments, a tenant may indicate preferences to allow content through an installed infotainment system (e.g., a personal screen with selective-content delivery, screens displaying for multiple users, and/or other integrated infotainment systems). In such embodiments, CDS 107 may provide (at 122*b*) content to Infotainment System ("ITS") 109. CDS 107 may provide the entertainment as packaged (e.g., from 120). In some embodiments, CDS 107 may provide instructions for the receiving device (e.g., UE 105 and/or ITS 109) to package the content (e.g., render frames and/or modules, insert advertisements, etc.). Prior to access, a user associated with a receiving device may be required to submit payment through a payment processing service (e.g., digital wallet, credit card, cash-only, etc.), determined by the tenant profile.

In some embodiments, packaging the content may include generating a web portal and/or some other sort of user interface, and providing the content by handling DNS requests or other requests from UEs 105. For example, UE 105 may connect to a wireless (e.g., WiFi) network provided by CDS 107 (e.g., connect to a Service Set Identifier ("SSID") associated with CDS 107), and may output a request (e.g., an Hypertext Transfer Protocol ("HTTP") request) for a particular Uniform Resource Locator ("URL") or webpage. CDS 107 may perform a DNS resolution to reroute the request to cause UE 105 to display the user interface associated with the currently selected tenant, may identify cached content (e.g., as stored by LCR 103) and provide the cached content, and/or may retrieve the requested content from content provider 113 or some other resource.

Figure 2A:
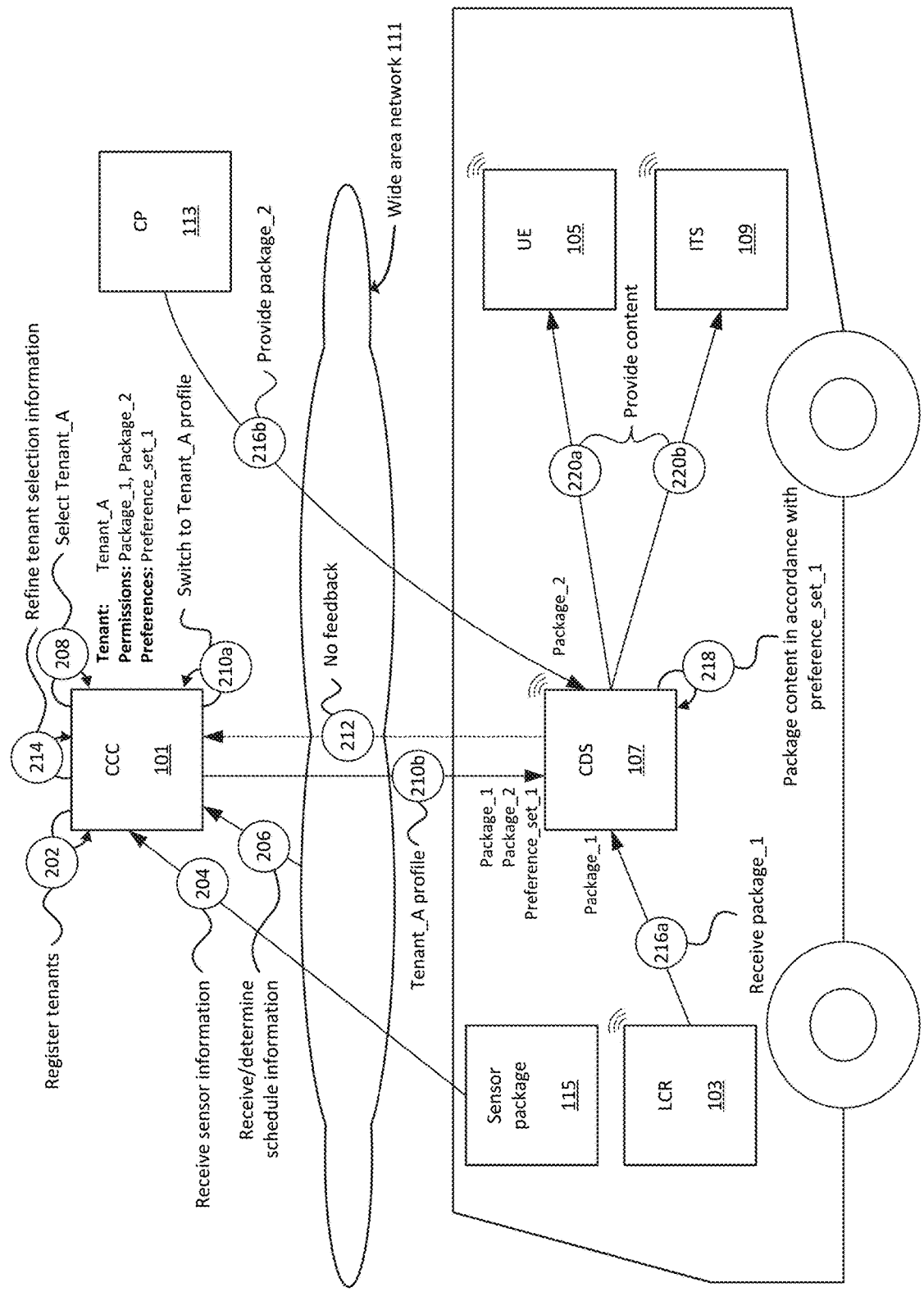
FIG. 2A illustrates an example overview of one or more embodiments, described herein, in which a content control component uses machine learning algorithms to switch to the proper profile to control content in a multi-tenancy environment.
Figure 2B:
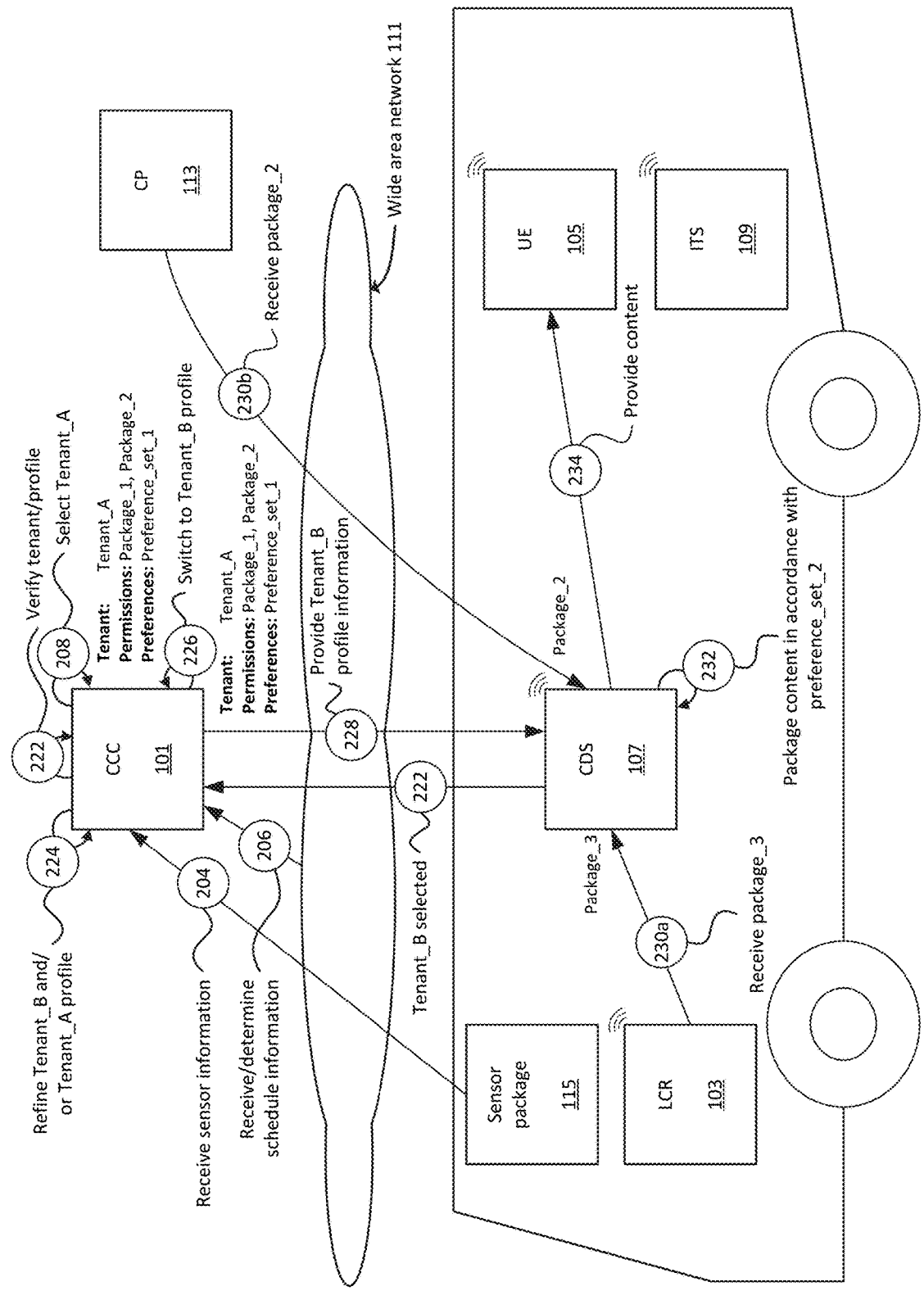
FIG. 2B illustrates an example overview of one or more embodiments, described herein, in which a content control component incorrectly determines a tenant profile and switches to a different profile.

FIGS. 2A and 2B provide further examples of some of the concepts described above with respect to FIG. 1. As shown in FIG. 2A, CCC 101 may register (at 202) one or more tenants. As described above, the registration may include information regarding each tenant in the environment, such as an identifier, content and/or resources each tenant may utilize, and/or additional information.

As further illustrated in FIG. 2A, CCC 101 may receive (at 204) sensor information. As described above, sensor information may include a variety of information regarding the environment such as location information, route information, timing information and/or other information.

CCC 101 may receive and/or determine (at 206) schedule information. As described above, CCC 101 may receive schedule information in a structured format. In some embodiments, as further described below, CCC 101 may utilize machine learning techniques to determine a schedule from an unstructured data source. In some embodiments, as described below, an environment may determine a schedule based on the schedule of other environments.

Based on the received sensor information (e.g., from 204), received schedule information (e.g., from 206), tenant profile (e.g., from 202), and/or other information, CCC 101 may select (at 208) a tenant. Assume, for example, that a location information for a particular bus depot has a high predictive value for a sole tenant, Tenant_A. When a bus is in that depot location, CCC 101 may determine, based on an affinity score between sensor data (e.g., location information indicating that the bus is in the particular depot location) and the predictive model for Tenant_A, that Tenant_A is operating the bus. In some embodiments, multiple pieces of information received by CCC 101 may be utilized to determine which tenant should be currently selected. For example, assume the affinity scores associated with Tenant_A and Tenant_B are equivalent, indicating both tenants are equally as likely to operate the bus. CCC 101 may select Tenant_A because Tenant_B most recently used the bus (i.e., indicating that the operation period for Tenant_B has ended, leading to operation by Tenant_A). In some embodiments, the same information may indicate an alternative prediction. For example, in continuing the same assumptions as above, where Tenant_A and Tenant_B have equivalent affinity scores, further assume that the bus has recently (e.g., within a threshold period of time, such as one week) been utilized by Tenant_A, while the bus has not been recently used by Tenant_B (but was used in the past). This may indicate that Tenant_B is no longer operating the bus, and an affinity score between Tenant_B and the sensor information (or other selection criteria) used to select Tenant_B for the bus no longer indicates that Tenant_B is operating the bus. In other words, the predictive model associated with Tenant_B may be refined to indicate that Tenant_B should not be selected for the bus, because Tenant_B has not operated the bus for at least a threshold period of time. As shown, CCC 101 may determine Tenant_A profile information (e.g., access to Package_1 and Package_2, and utilization of preference_set_1). Packages and preference sets are implementations of how content can be associated with a given tenant, and example explanations of packages and preference sets are described below.

As further illustrated in FIG. 2A, CCC 101 may switch (at 210*a*) to the Tenant_A profile and provide (at 210*b*) Tenant_A profile information to CDS 107. Once switched, CCC 101 may restrict access to resources based on Tenant_A profile information. As shown, providing the profile to CDS 107 may include an indication of access to Package_1 and Package_2 utilizing preference_set_1.

As illustrated in FIG. 2A, CCC 101 may receive (at 212) no feedback regarding the tenant selection (e.g., no feedback within a threshold time period). As discussed above, this may create a presumption that the tenant selection was correct. Consequentially, CCC 101 may refine (at 214) tenant selection information indicating that the predictive model associated with the selected tenant (Tenant_A) was correct based on the sensor and/or schedule information.

As illustrated, CDS 107 may receive (at 216*a* and 216*b*) content. As discussed above, content may be accessed from different sources. For example, some content (e.g., package_1, as shown) may be provided by LCR 103 while other content (e.g., package_2) may be provided by CP 113 via WAN 111.

As further illustrated, CDS 107 may package (at 218) content (e.g., received at 216*a* and 216*b*) according to determined preferences (e.g., from 210*b*). As discussed above, tenants may have preferences for how content is displayed (e.g., in a frame with modules, etc.) or how advertisements, if used, are displayed (e.g., pre-roll, length of advertisements, type of advertisements, etc.). Similar to the selection of tenants, preference sets associated with tenants may be provided in a differentiated basis as well (e.g., based on sensor information and/or other criteria, such as an identifier or user profile associated with UE 105).

As shown, CDS 107 may provide (at 220*a* and 220*b*) content to UE(s) 105. As discussed, depending on tenant profile information, content may be provided to different displays. For example, in some embodiments content may be provided (at 220*a*) to UE 105 and/or provided (at 220*b*) to ITS 109. As discussed, certain content may be limited (e.g., depending on permissions and/or preferences, from 210*b*) and/or packaged in a different format (e.g., at 218).

In some embodiments, an incorrect tenant profile may be selected, and CCC 101 may receive information correcting the tenant selection, based on which predictive models associated with the selected tenant may be refined. For example, as shown in FIG. 2B, CCC 101 may receive various information (e.g., sensor information at 204, schedule information at 206, etc.) and may further determine (at 208) that Tenant_A is operating the bus. However, CCC 101 may receive (e.g., at 222) feedback (e.g., an indication from a user and/or a selection via CDS 107) that Tenant_B is operating the bus. Consequentially, as discussed above, CCC 101 may refine (at 224) the predictive models associated with Tenant_A and/or Tenant_B, in a manner that strengthens the determination that the received schedule and/or sensor information is associated with Tenant_B (and/or weakens the determination that the schedule and/or sensor information is associated with Tenant_A). Therefore, in future instances where the same and/or similar sensor/schedule information is provided to CCC 101, CCC 101 is less likely to select Tenant_A as the bus operator and is more likely to select Tenant_B as the bus operator.

Continuing with the example, FIG. 2B illustrates that CCC 101 would switch (at 226) to the Tenant_B profile (e.g., as indicated, access to package_2, and package_3 while utilizing preference_set_2). CCC 101 may provide (at 228) Tenant_B profile information to CDS 107.

As further illustrated, CDS 107 may receive (at 230a) package_3 from LCR 103 and receive (at 230b) package_2 from CP 113. CDS 107 may package (at 232) content in accordance to preference_set_2 (in lieu of preference_set_1 as indicated by Tenant_A preferences). As further illustrated, based on the Tenant_B profile information (e.g., preference_set_2), CDS 107 may provide (at 234) content to UE 105 (instead of both UE 105 and ITS 109 as indicated in preference_set_1).

In some embodiments, CCC 101 and/or one or more other devices may receive the schedule information for an environment, which may occur based on machine learning techniques. Machine learning techniques allow a device to create a predictive model based on inputs. A device utilizing machine learning may take a source of information and determine predictive models based on the analyzed information. Machine learning techniques may utilize user-reinforced feedback, wherein a user (of the device) indicates whether the machine learning technique was correct in its predictive model. In such situations, the device may utilize the feedback to alter other predictive models (e.g., in situations where the feedback affirms the prediction, the device may make similar predictions, wherein if the feedback rejects the prediction, the device may make adjustments to determine less similar predictive models, etc.).

Machine learning techniques may require information provided as an input. In some embodiments, machine learning techniques may utilize unstructured data to determine information for use to compare to past predictive models.

Figure 3A:
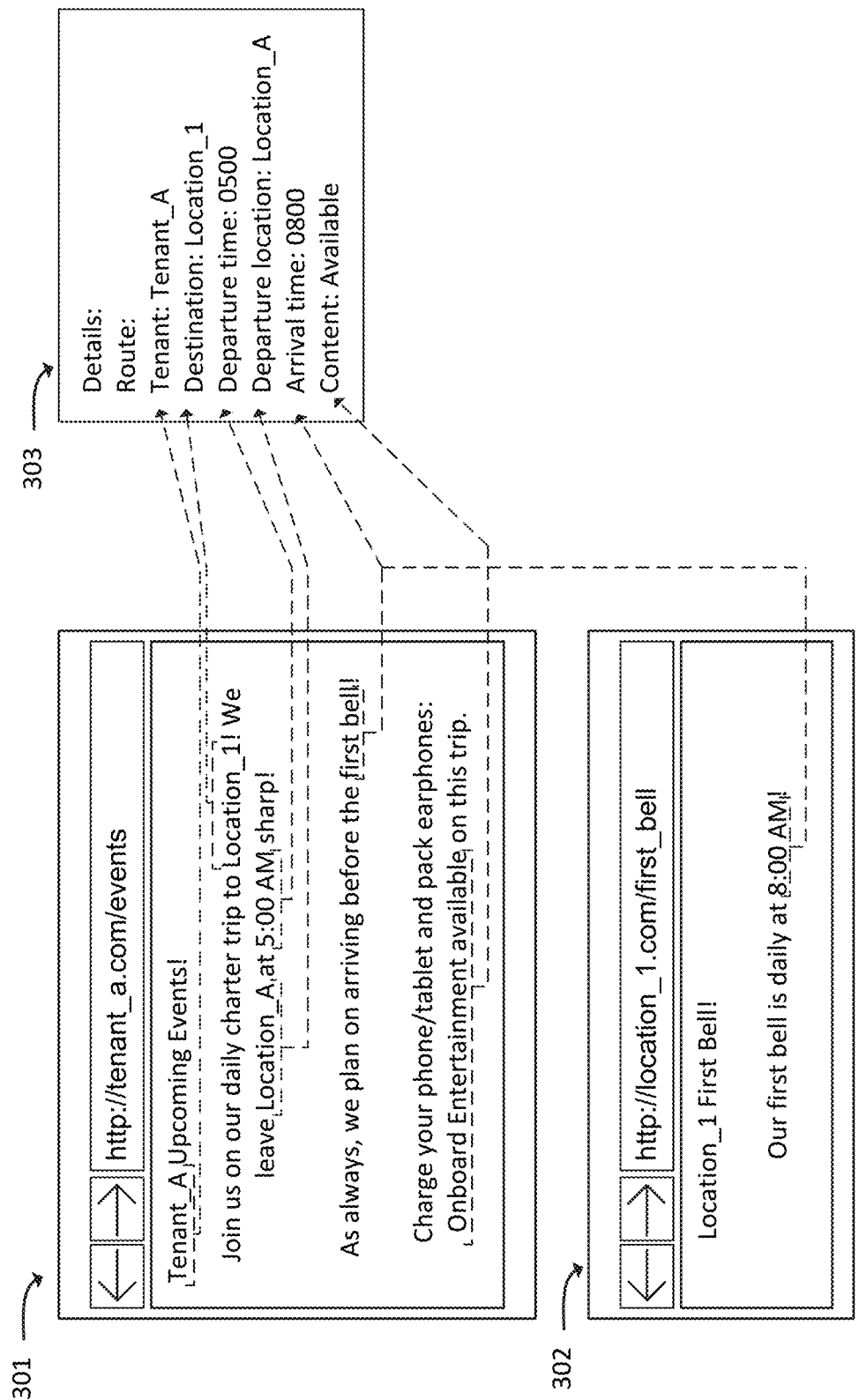
FIG. 3A illustrates an example determination of operation information based on crawling techniques to analyze unstructured data, in accordance with some embodiments described herein.

For example, as shown in FIG. 3A, CCC 101 may "crawl" Internet websites and/or other sources of information to determine information relevant to the selection of tenants in a multi-tenancy environment (e.g., route information, bus schedules, train schedules, locations of transportation hubs, maps that indicate roads or other travel routes between cities or transportation hubs, etc.). FIG. 3A illustrates graphical representations of webpages (e.g., as a user may view the webpages), but in reality, CCC 101 may utilize other techniques such as analyzing the source code associated with a web page to obtain information.

As shown, CCC 101 may navigate to example webpage 301 associated with a tenant utilizing the environment (i.e., as shown, http://tenant_a.com/events). CCC 101 may utilize NLP and/or some other technique to parse language to determine a schedule. For example, CCC 101 may determine that following the phrase, 'We leave' denotes a phrase that includes a departure location and time (i.e., Location_A, 5:00 AM). Consequentially, CCC 101 may store the information in data structure 303. Similarly, CCC 101 may determine that based on the phrase 'trip to' the following information may denote a phrase that includes the destination (i.e., Location_1) and store that information in the corresponding location in data structure 303. In the same manner, CCC 101 may determine that based on the phrase 'Onboard Entertainment available' that content should be provided and store that information in the corresponding location in data structure 303.

In some embodiments, missing information may be determined by navigating to a second webpage. For example, as illustrated in 3A, CCC 101 may navigate to a second webpage 302 associated with Location_1 (i.e., as shown, http://location_1.com/first_bell) based on the information obtained from the first webpage to determine the arrival time. As shown, CCC 101 may determine that the phrase 'arriving before the first bell' indicates an arrival time (e.g., using NLP and/or some other technique), but that the phrase 'first bell' is not a useful arrival time (e.g., using NLP and/or some other technique). CCC 101 may determine (e.g., using NLP and/or some other technique) that the phrase 'daily at 8:00 AM' may be a suitable replacement for 'first bell' as used on webpage 301 which is more useful to determine the schedule. Therefore, as shown, CCC 101 may determine that the arrival time is at or before 8:00 AM and store that information in data structure 303.

In some embodiments (not shown), machine learning techniques may be modified by feedback. For example, CCC 101 may receive feedback to indicate a particular source of information may not be accurate or useful to determine a schedule. For sake of example, if CCC 101 selects a tenant based on information obtained via a webpage and CCC 101 receives tenant selection information which indicates that the tenant selection was incorrect, CCC 101 may stop utilizing that particular webpage for information regarding schedules. This may occur, for example, if a webpage has not been updated with more recent scheduling information (e.g., a webpage maintains an archive of information which is not current, but is still discoverable). As a further example, CCC 101 may receive information suggesting that the interpretation of unstructured data was incorrect. For example, CCC 101 may receive an indication that values in a schedule were incorrect. For sake of an example, assume CCC 101 placed the start time in the data structure location for the end time, and the end time in the data structure location for the start time (i.e., the start and end times are switched in the data structure). Based on feedback, CCC 101 may determine that the NLP techniques to determine the start and end times were incorrect and refine the NLP parsing accordingly. In some embodiments, CCC 101 may establish, based on feedback, that some sources of information are more reliable than others. For example, CCC 101 may be directed to obtain information regarding a tenant schedule from a particular webpage (e.g., http://tenant_a.com), rather than a webpage associated with an entity appearing similar to the tenant (e.g., http://tenantA.com).

As shown in FIG. 3A, not all information may be obtained through machine learning techniques. For example, as shown, route number information remains blank in data structure 303. In such instances, particularly in instances where the information is not critical (i.e., route number) CCC 101 may assign a value.

As further illustrated in FIG. 3B, CCC 101 may determine an operation schedule which may provide a basis for the predictive models. Data structure 304 may be determined by crawling one or more webpages and/or network locations. For example, data structure 304 may be established after a series of NLP techniques (e.g., as depicted in FIG. 3A) and/or established by analyzing a previously created schedule (e.g., made by a tenant, separate environment, etc.). As shown, data structure 304 may provide schedule information for multiple busses. CCC 101 may use data structure 304 to determine, for example, that Tenant_A is the only tenant in Location_A, that Tenant_B and Tenant C share Location_C but may operate at Location_C during different times, that Tenant_B is the only tenant to operate to Location_2, that Tenant_A route numbers start with "41," and/or other predictive models regarding tenants.

As shown in FIGS. 4A and 4B, for example, machine learning techniques may be used to determine the tenant associated with each route. For example, FIG. 4A may indicate the use of Bus #555 (the environment) including travel from and to several locations at various times (in a 24-hour format). CCC 101 associated with Bus #555 may have determined and/or received information regarding the various routes operated over the time period but may not know the tenant associated with each route. Based on predictive models determined from received information (i.e., as shown in FIG. 3B), CCC 101 may determine the tenant associated with each route. For example, as shown in FIG. 4B, CCC 101 may determine that Tenant_A may operate Route #4158 and Route #4157 (i.e., based on one or more determined predictive models (e.g., the locations and/or route numbers, etc.)). As a further example, Tenant_B may be determined to operating Route #5123 and Route #5124 (i.e., based on one or more predictive models (e.g., scheduled departure time and locations, etc.)).

Figure 5B:
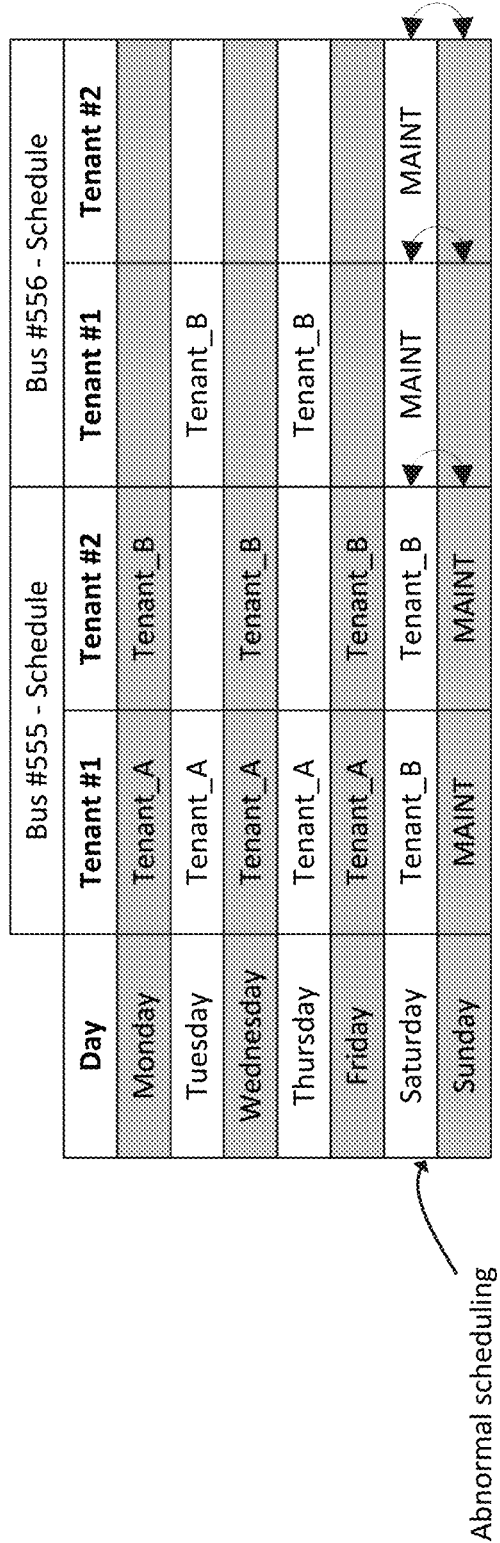

A schedule may be determined based on other schedule(s). For example, as shown in FIGS. 5A and 5B, a schedule may be altered based on abnormal schedule. Assume, for the sake of example, that Bus #555 (as depicted in FIG. 5A) has a routine schedule with a scheduled maintenance day on Saturday and that Bus #556 also has a routine schedule which includes operation by Tenant_B on Saturday and a maintenance day on Sunday. If, as depicted in FIG. 5B, Bus #556 switches the maintenance day (as depicted by the double-headed arrows between Saturday and Sunday), Bus #555 may detect abnormal scheduling and adjust the schedule accordingly. For example, as depicted, Bus #556 may take Tenant_B on Saturday and switch maintenance to Sunday (as depicted by the double-headed arrows between Saturday and Sunday).

In some embodiments (not depicted), CCC 101 may determine a schedule on a more granular (e.g., minute-by-minute basis) in order to determine turn-over services (e.g., cleaning, uploading data, downloading data, etc.). For example, if CCC 101 detects (via one or more sensors) that the bus is in a specific location, and that specific location was the destination (instead of, for example, a rest stop), CCC 101 may determine that the bus is ready for turn-over services. The environment may signal an indication providing that services may be rendered. For example, if a bus arrives at a destination and a new content package is available, the bus may signal to start downloading the new content package if there is enough time to complete the download (based on download speed, package size, period until the start of the next route, and/or other factors). This may be utilized in embodiments where content packages may take an extended period of time to transfer.

Figure 6A:
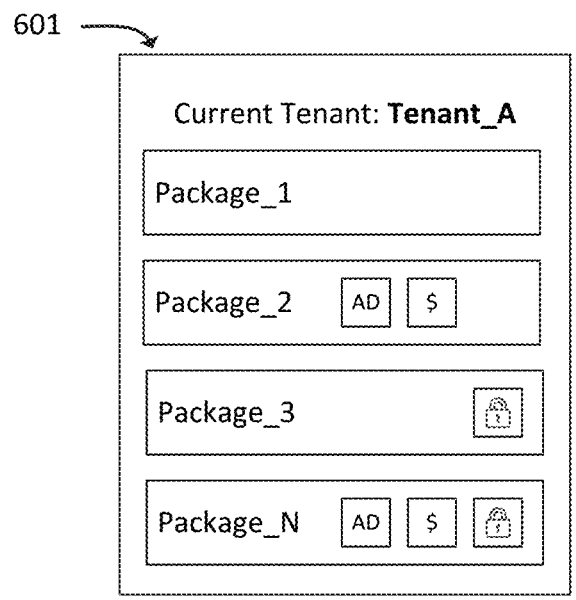
FIGS. 6A and 6B illustrate example content packages associated with different tenants (e.g., different tenant profiles), in accordance with some embodiments described herein.
Figure 6B:
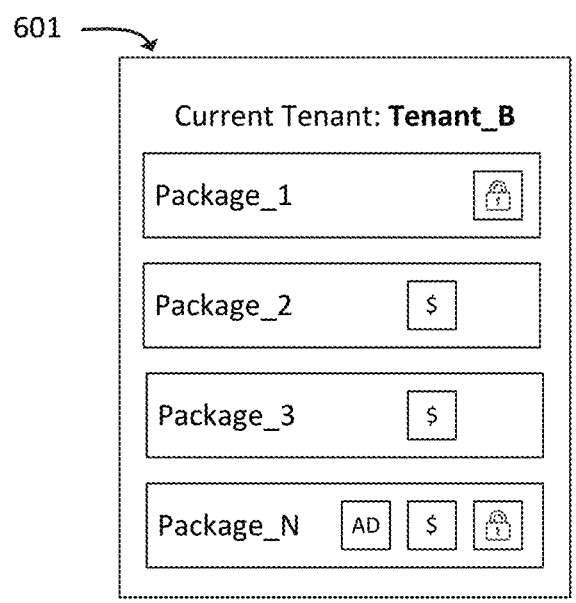

FIGS. 6A and 6B illustrate, in a graphical format, example user content available to tenants in environment 601. As discussed herein, environment 601 may refer to a particular environment in which a particular CDS 107 operates (e.g., where one instance of environment 601 is a first bus or other vehicle, while another instance of environment 601 is another bus or other vehicle). As discussed above, environment 601 may be available to both Tenant_A and Tenant_B. Packages (e.g., content packages, etc.) may be pre-installed in environment 601 (as shown by Package_1 through Package N), such as at CDS 107 and/or LCR 103, and access may be limited in accordance with tenant profile information. For example, access to packages may be determined by the permissions and/or preferences indicated in a registration with a device, such as CCC 101 (e.g., as depicted in FIG. 1, step 102). In some embodiments, preferences and/or packages may be determined based on previous usage (e.g., using machine learning to determine which packages a tenant typically elects to provide). For example, if a new content package becomes available, and it is similar to a package a particular tenant has provided previously, CCC 101 may determine to provide the new content package to the particular tenant (similarly, CCC 101 may determine to not provide a package similar to a previous package that was not utilized). Environment 601 may embody several content groupings (as indicated, for example, as Package_1 through Package N). In practice, environment 601 may include more or fewer content groupings than depicted and may include more or fewer content limitations (e.g., advertisements (as indicated by the "AD" box), locked (as indicated by the "lock" box), and/or pay-to-access (as indicated by the "$" box)) than depicted.

For example, as illustrated in FIG. 6A, Tenant_A may be able to access Package_1 and Package_2, while not being able to access Package_3 (as depicted by the "lock" box). As depicted, Package_1 may have no access requirements (as depicted by the lack of the "AD" and "$" boxes). Therefore, based on the permissions and preferences, a user may access content in Package_1 without advertisements and/or paying for access. In contrast, Package_2 may be accessed by the use of advertisements (as indicated by the "AD" box) and/or through payment (as indicated by the "$" box). Therefore, users in the Tenant_A environment may, for example, access content in Package_2 by viewing advertisements and/or by paying for the content.

As illustrated in FIG. 6B, Tenant_2 may operate in the same environment 601, and may limit access to only Package_2 and Package_3 (as indicated by the "lock" box adjacent to Package_1). As illustrated, Package_2 and Package_3 would require a user to pay for the content in Package_2 or Package_3 (as indicated by the "$" box).

Figure 7A:
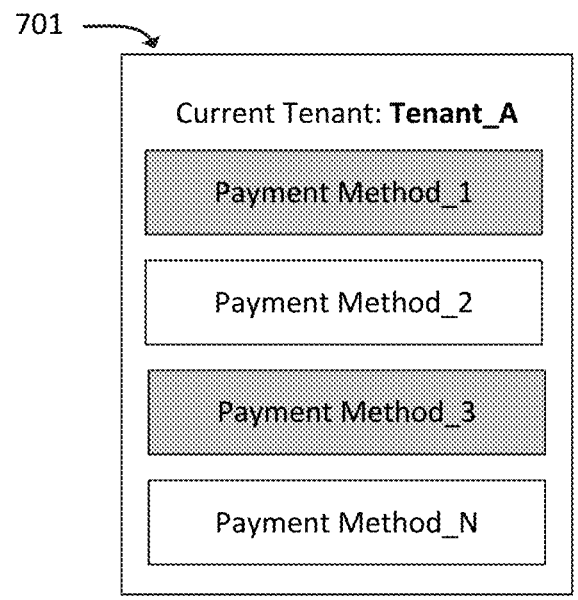
FIGS. 7A and 7B illustrate examples of different sets of payment methods, which may be utilized or offered by different tenants, in accordance with some embodiments described herein.
Figure 7B:
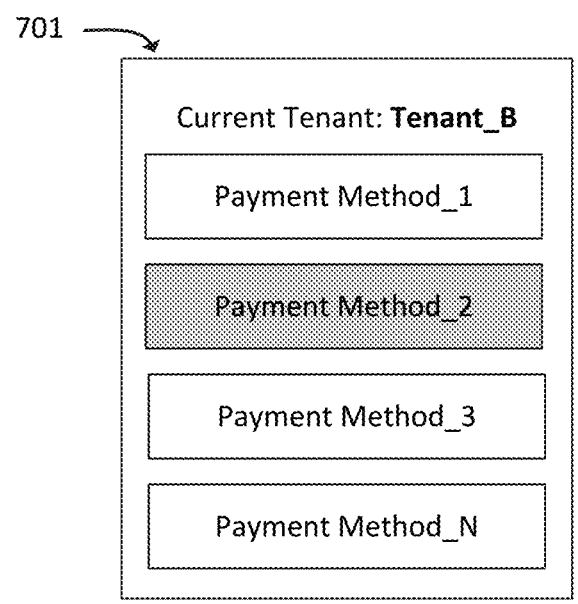

FIGS. 7A and 7B illustrate same tenant payment method environment 701. As discussed above, multiple tenants may operate within the same environment and have different access and/or preferences. As indicated above, CCC 101 may limit access to certain service packages (i.e., as shown here, payment methods) based on the tenant profile information provided to CCC 101 (e.g., as depicted in FIG. 1, at 102). In some embodiments, as discussed above, permissions may be determined by received tenant information (e.g., as depicted in FIG. 1, at 104). Environment 701 may embody several payment methods (as indicated, for example, as Payment Method_1 through Payment Method N). In practice, environment 701 may include more or fewer services than depicted.

As indicated in FIG. 7A, for example, Tenant_A may have indicated preferences and/or access for Payment Method_2 and/or Payment Method N (as indicated by the white background), while electing to not use Payment Method_1 and Payment Method_3 (as indicated by the gray background).

As indicated in FIG. 7B, for example, Tenant_B, operating within the same environment 701, may have preferences and/or access indicating the use of Payment Method_1, Payment Method_3, and/or Payment Method N (as indicated by the white backgrounds), while not utilizing Payment Method_2 (as indicated by a gray background).

Tenants operating within an environment may have different preferences for how content is displayed. FIGS. 8A-8D illustrate example entertainment content distributions 801-804.

As shown in FIG. 8A, for example, entertainment content distribution 801 may include only a "pre-roll" advertisement (as indicated by the diagonal-hashed box, labeled "advertisement"). The tenant may indicate the preference for this type of advertising when registering with the environment (e.g., as depicted in FIG. 1, at 102) and/or when providing tenant information (e.g., as depicted in FIG. 1, at 104) with the environment. Advertising content may be provided by the environment and/or may be customized by the tenant (e.g., set in preferences through registration and/or through providing tenant information). Content may be provided without further advertisement interruptions (as indicated by the white box labeled "content") after the pre-roll advertisement.

Some embodiments may exist where advertisements are interspersed within content. For example, as shown in FIG. 8, content distribution 802 may have several advertisements (indicated by the diagonal-hashed boxes labeled "advertisement") placed between content (indicated by the white boxes labeled "content"). As previously indicated, the advertisements and/or manner of displaying advertisements may be set in tenant preferences (e.g., the tenant may provide the specific advertisements to play in addition to providing the manner in which they are presented). In some embodiments, tenants may utilize advertisements provided by the environment. Similarly, in some embodiments, content may be provided by the tenant and/or by the environment (e.g., a tenant may provide specific content to play). The advertisements may be pre-arranged to be presented in a particular manner (e.g., content may be edited in order to include advertisements throughout the content).

In some embodiments, advertisements may be interspersed throughout content based on machine learning techniques. For example, content package 802 may be modified to include advertisements based on a determination that a particular time in the content would be suited for an advertisement (e.g., natural pause, period normally reserved for a commercial break during broadcast, etc.). In some embodiments, the advertisements may be affirmed using user-reinforced machine learning where a user may confirm appropriate placement for advertisements (e.g., provided by feedback from the users viewing the content, a user associated with the tenant, and/or some other person). In such embodiments, advertisements are likely to be placed in locations similar to the affirmed location (e.g., based on the same and/or similar indication of an advertisement location). In contrast, when a user rejects an advertisement placement, it is less likely that the advertisement will be similarly placed. In some embodiments, the advertisements may be affirmed by querying a third-party advertiser (e.g., via WAN 111) using known characteristics of the end-user and/or tenant and/or environment information. CCC 101 may report details of the advertisement consumption back to the third party and/or an intermediary (e.g., an agent) acting on behalf of the third-party advertiser.

Figure 8C:
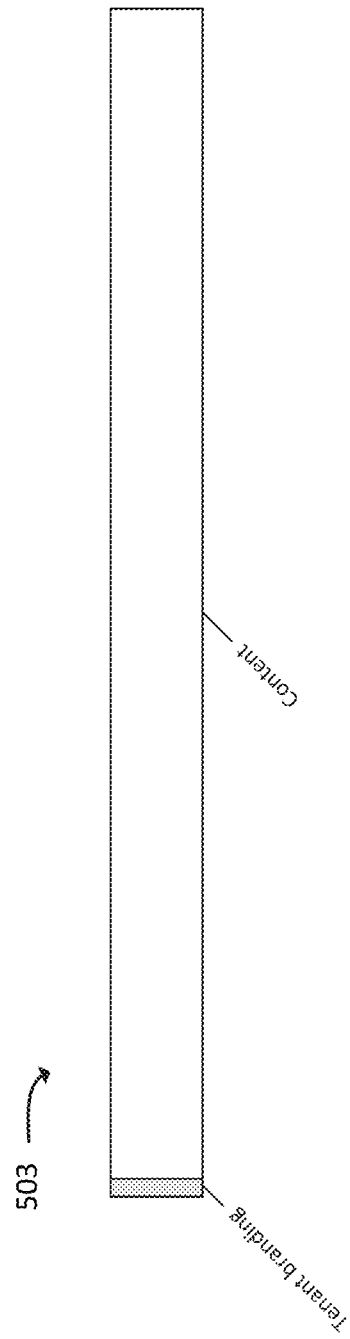

Some embodiments may exist where content is displayed with a branding package. For example, as shown in FIG. 8C, content distribution 803 may include tenant branding material (as illustrated by the gray box labeled "tenant branding") in content. Tenant branding may exist, for example, in a white label environment where a tenant packages content in accordance a branding scheme. Tenant branding preferences and/or tenant branding material may be provided during registration and/or with tenant information. While not explicitly shown in FIG. 8C, the use of tenant branding does not preclude the use of advertisements (e.g., advertisements may still be included in the content package).

Figure 8D:
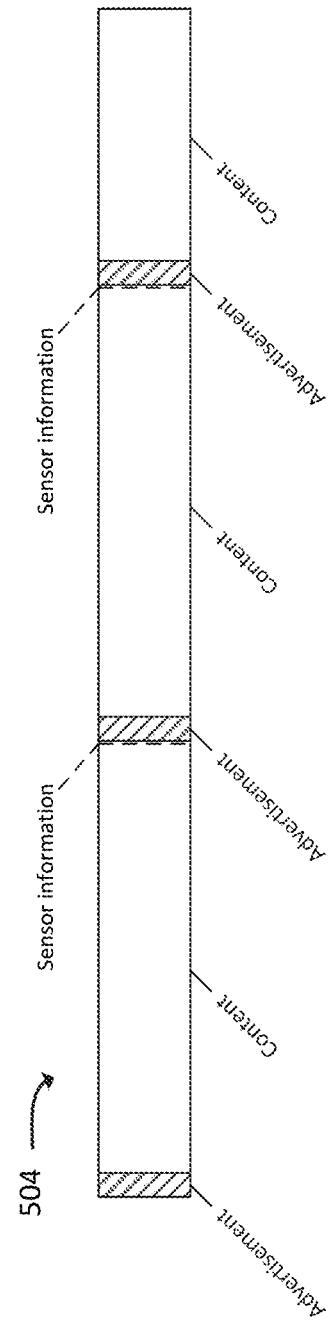

In some embodiments, a content package may be modified by sensor information. For example, as shown in FIG. 8D, content distribution 804 may include one or more advertisement(s) after receiving sensor information (as indicated by the dashed line labeled "sensor information"). As described above, sensor information may include information such as location data, timing data, and/or other information. For example, assume that the content associated with content distribution 804 is a tour operating in a hop-on-or-off sightseeing bus. The environment may receive information indicating a location proximate to a particular vendor. Upon receiving that information, the environment may inject an advertisement for that particular vendor into the tour content. This feature allows the content to be packaged in a more flexible manner to be more precise as to when to play the advertisement. In some embodiments, the content may be modified by sensor information. For example, continuing with the tour guide package example described above, the bus may play content relating to landmarks proximate to the environment upon receiving sensor information (e.g., instead of advertisements, play information regarding the landmark).

Figure 9A:
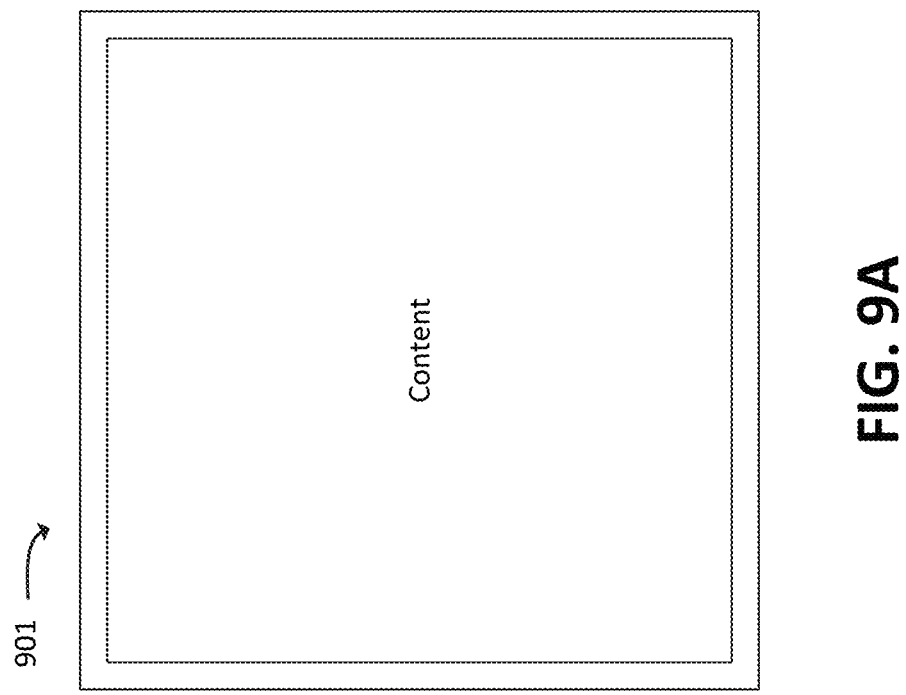

In some embodiments, content packages may be rendered into a frame according to tenant preferences as depicted in FIGS. 9A and 9B. For example, as shown in FIG. 9A, content frame 901 may allow content to be displayed without additional modules, frames, and/or other renderings.

In some embodiments, as shown in FIG. 9B, content may be displayed within content frame 902. As shown, content frame 902 may include one or more modules in addition to the content. Modules may be indicated by tenant preferences. Modules may include, for example, advertisements, entertainment modules, informational modules, and/or other modules.

Figure 10:
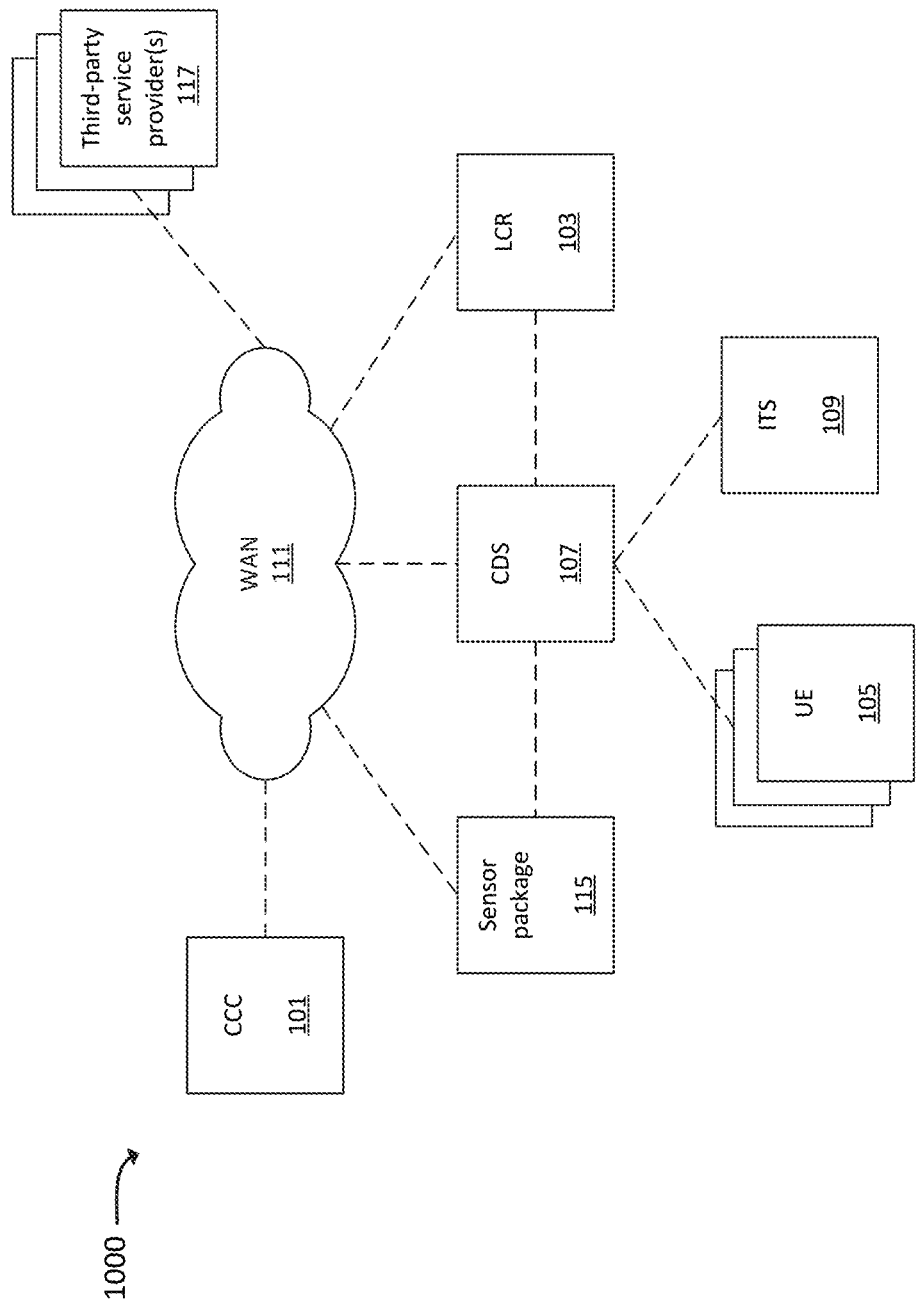
FIG. 10 illustrates an example environment in which one or more embodiments, described herein, may be implemented.

FIG. 10 depicts an example environment 1000, in which one or more embodiments may be implemented. Environment 1000 may be implemented in portable infrastructure and/or a stationary object. As shown, environment 1000 may include Content Control Component ("CCC") 101, Local Content Repository ("LCR") 103, User Equipment ("UE") 105, Content Delivery System ("CDS") 107, Infotainment System ("ITS") 109, Wide Area Network ("WAN") 111, sensor package 115, and/or third party service provider(s) 117.

The quantity of devices and/or networks, illustrated in environment 1000, is provided for explanatory purposes only. In practice, environment 1000 may include additional devices, fewer devices, different devices, or differently arranged devices than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

CCC 101 may include one or more devices which control tenant permissions and/or preferences. In some embodiments, CCC 101 may include one or more web-based resources (e.g., cloud-computing system and/or some other type of device or system). CCC 101 may, for example, store information regarding various tenants in a repository. CCC 101 may receive the information from a registration and/or from information provided to indicate which tenant is utilizing environment 1000. As further described herein, CCC 101 may receive information from Sensor Package 115 in order to provide content and/or services.

LCR 103 may include one or more devices which maintain content and/or resources. In some embodiments, LCR 103 may maintain information regarding a particular tenant such as preferences, access, and/or other information. LCR 103 may provide content and/or information to CCC 101 for provisioning in accordance with tenant preferences and/or permissions.

UE(s) 105 may include a computation and communication device, such as a wireless mobile communication device that is capable of communicating with CCC 101. UE 105 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a personal gaming system, a wearable device, a Mobile-to-Mobile ("M2M") device, an integrated display, personal display unit, or another type of computation and communication device.

CDS 107 may include one or more devices which deliver content. In some embodiments, CDS 107 may package content according to tenant preferences, in accordance with embodiments described herein. For example, CDS 107 may contain encoding software and/or devices which package content as illustrated in FIGS. 8A-8D, 9A, and 9B. CDS 107 may also contain content cryptography software and/or devices that facilitate digital rights management ("DRM") activities and enforcement such as encryption, decryption, cryptographic key exchange management, authorization, or usage duration limits, that are required to protect the content from unauthorized access and copying, for playing back such content on an authorized player, and setting usage time limits. In some embodiments, the use of cryptography by the CDS 107 may require interaction with third-party service provider 117. CDS 107 may use more than one cryptographic technique and/or ecosystem to satisfy the DRM requirements. CDS 107 may require multiple copies of content to be compliant with different cryptographic techniques/ecosystems (e.g., content copies may be encrypted according to different cryptographic techniques, etc.). CDS 107 may further support one or more services in accordance with tenant preferences. For example, in some environments, CDS 107 may operate a payment processing service. CDS 107 may deliver content and/or receive information from UE 105 and/or ITS 109. CDS 107 may receive content from LCR 103 and/or one or more other devices (e.g., third-party services 117). CDS 107 receives profile information from CCC 101.

ITS 109 includes one or more devices suitable to display content to a user. In some embodiments, ITS 109 may be installed in an operating environment. In environments, ITS 109 may be connected to a LAN via a hardwire connection (e.g., ethernet cable, etc.) and/or by a wireless network. ITS 109 may receive content and/or other information from CDS 107.

WAN 111 may include one or more wired and/or wireless networks. For example, WAN 111 may include the Internet, a private enterprise network, and/or one or more other networks. CCC 101 may communicate with CDS 107 via WAN 111. In some embodiments, CDS 107 may communicate, via WAN 111, with one or more third party service providers(s) 117.

Sensor package 115 may include one or more devices suitable to receive ambient information. For example, sensor package 115 may include an image sensor (e.g., charged coupled device ("CCD"), complementary metal-oxide-semiconductor ("CMOS"), etc.), temperature sensor, timing sensor (e.g., digital clock, etc.), location determination circuitry (e.g., one or more GPS devices), an OBD device (e.g., an OBD-II device), and/or other sensors. Sensor package 115 may communicate with CCC 101 and/or CDS 107.

Third party service provider(s) 117 may include one or more third party service providers which may provide resources to environment 1000. For example, third party service providers may include DRM services, third party content providers (e.g., CP 113), payment processing providers, analytics services, advertisement providers, and/or one or more other services. Third party service provider(s) 117 may communicate with CCC 101 and/or CDS 107 via WAN 111.

Figure 11:
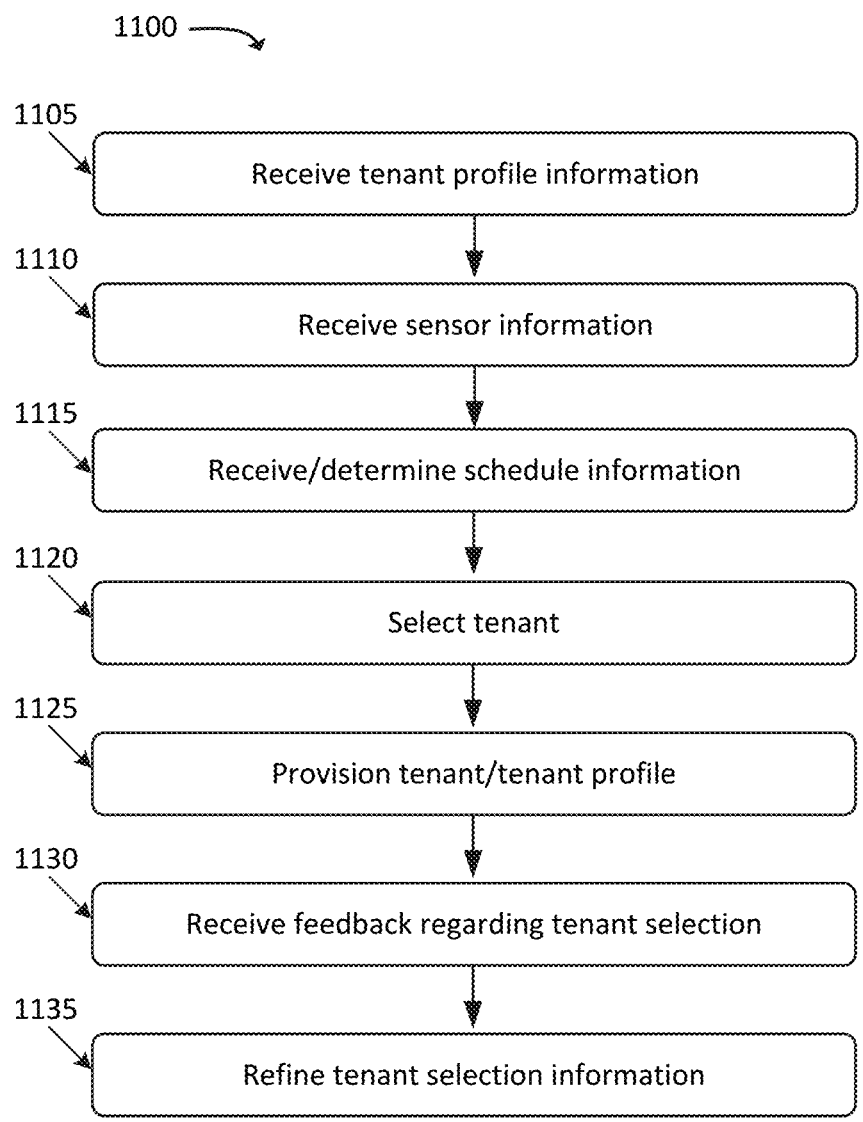
FIG. 11 illustrates an example process for determining the active tenant in a multi-tenancy environment, in accordance with some embodiments herein.

FIG. 11 illustrates an example process 1100 for selecting a tenant information in a multi-tenant environment based on machine learning techniques. In some embodiments, some or all of process 1100 may be performed by CCC 101. In some embodiments, one or more other devices may perform some or all of process 1100 (e.g., in concert with, and/or in lieu of, CCC 101).

As shown, process 1100 may include receiving (at 1105) information regarding the tenant. As described above, tenant profile information may be received through a registration step and/or through a provision of information to CCC 101 prior to use. Tenant profile information may include an identifier, tenant preferences, content for the tenant, and/or other information. Information may be stored by CCC 101 and/or one or more other devices.

Process 1100 may further include receiving (at 1110) sensor information. As described above, in some embodiments, the tenant may be determined based on received sensor information from sensor package 115. For example, in some embodiments, location information may indicate a loading depot and/or other location which is used exclusively by a particular tenant. Sensor information may be utilized to determine the tenant currently utilizing the environment. In some embodiments, sensor information may be utilized to manage content (e.g., change content packaging, etc.).

Process 1100 may include determining and/or receiving (at 1115) schedule information. As discussed above, schedule information may include information such as when environment 1000 is being utilized. In some embodiments, the schedule information may be determined based on received sensor information (e.g., from 1110). In some embodiments, the schedule information may be determined based on information received by CCC 101. For example, as described above, CCC 101 may analyze a network (e.g., LAN, WAN (e.g., webpage, etc.), etc.) to determine a schedule (e.g., as described above, "crawl" a webpage to determine relevant route information, etc.). CCC 101 may determine a schedule based on schedules of related environments (e.g., as described above, detecting a shift away from a routine schedule, etc.).

Process 1100 may additionally include selecting (at 1120) the tenant. As described, in some embodiments, the tenant currently utilizing environment 1000 may be determined based on the received information regarding the tenant (e.g., from 1105), the sensor information (e.g., from 1110), the schedule information (e.g., from 1115), and/or other information. In some embodiments, the tenant may be determined utilizing machine learning techniques. For example, a tenant may be determined by predicting, based on historical usage, what tenant is utilizing an environment (e.g., as described above, a predictive model may be created, for example, based on a departure location, etc.). As discussed above, a tenant may be selected based on a score associated with a predictive model for the tenant. As discussed above, in some embodiments, a tenant selection may occur upon a triggering event.

Process 1100 may also include provisioning (at 1125) tenant/profile information. In some embodiments, as discussed above, CCC 101 may provision tenant/profile information to a device, such as CDS 107.

Process 1100 may additionally include receiving (at 1130) selection feedback. As discussed above, different feedback may modify confidence for predictive models different. For example, user provided feedback (e.g., user-reinforced feedback) may modify a predictive model more than inferred feedback (e.g., wherein CCC 101 determines feedback by a lack of receiving user-reinforced feedback).

Process 1100 may further include refining (at 1135) tenant selection information. As discussed above, refining tenant selection information may include providing information regarding each tenant based on corresponding inferences and/or reliabilities associated with each tenant. As discussed above, with more iterations of selection, the information associated with each tenant becomes more accurate.

Figure 12:
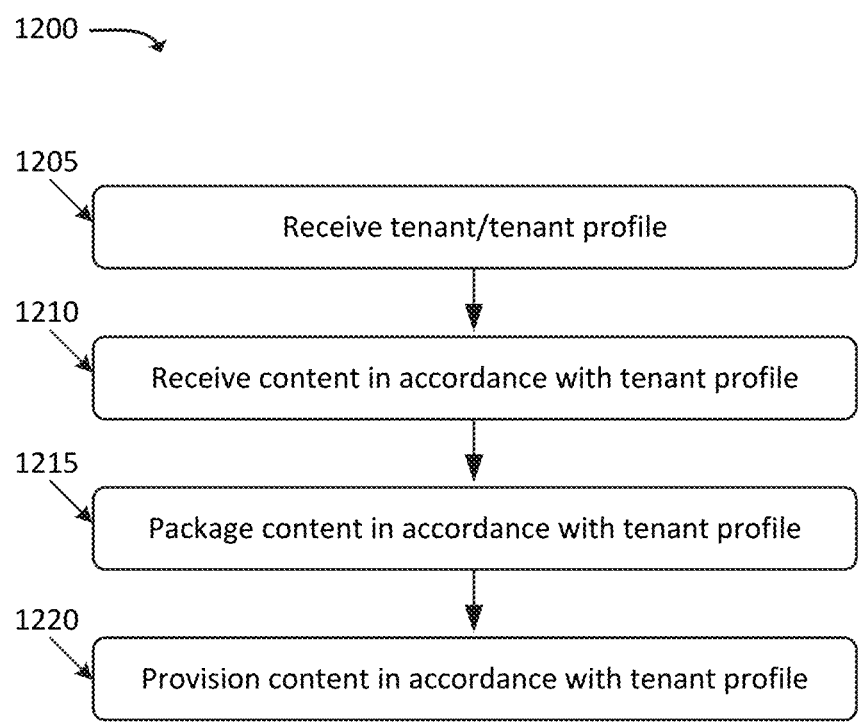
FIG. 12 illustrates an example process for managing content in accordance with tenant profile information.

FIG. 12 illustrates an example process 1200 for managing content based on received tenant/profile information. In some embodiments, some or all of process 1200 may be performed by CDS 107. In some embodiments, one or more other devices may perform some or all of process 1200 (e.g., in concert with, and/or in lieu of, CDS 107).

Process 1200 may include receiving (at 1205) tenant/profile information. As discussed above, CCC 101 may determine a tenant/profile information and provision it to CDS 107 to utilize for managing content information.

Process 1200 may include receiving (at 1210) content. As discussed above, content may be stored within a repository, such as LCR 103 and/or one or more other repositories. In some embodiments, the content may be provided with information regarding the tenant. For example, in some environments, particular content, such as white label branding materials, may be provided during registration and/or during provisioning information regarding the tenant.

Process 1200 may further include packaging (at 1215) content in accordance with tenant preferences. For example, as described above, tenants may indicate preferences for how content is packaged (e.g., in accordance with advertisement preferences, in accordance with framing preferences, additional modules preferences, advertisement preferences, etc.). CCC 101 may render content according to the provided tenant preferences or may provide the content and instructions for the displaying device (e.g., UE 105 and/or ITS 109) to render the content.

Process 1200 may additionally include provisioning (at 1220) content to displaying device(s) (e.g., UE 105 and/or ITS 109). The provisioning may occur in accordance with network embodiments (e.g., wired or wireless networks). As discussed above, in some embodiments, the content may be pre-rendered to incorporate tenant preferences (e.g., advertising, frame, etc.) or may provide raw content with instructions to render the content.

Figure 13:
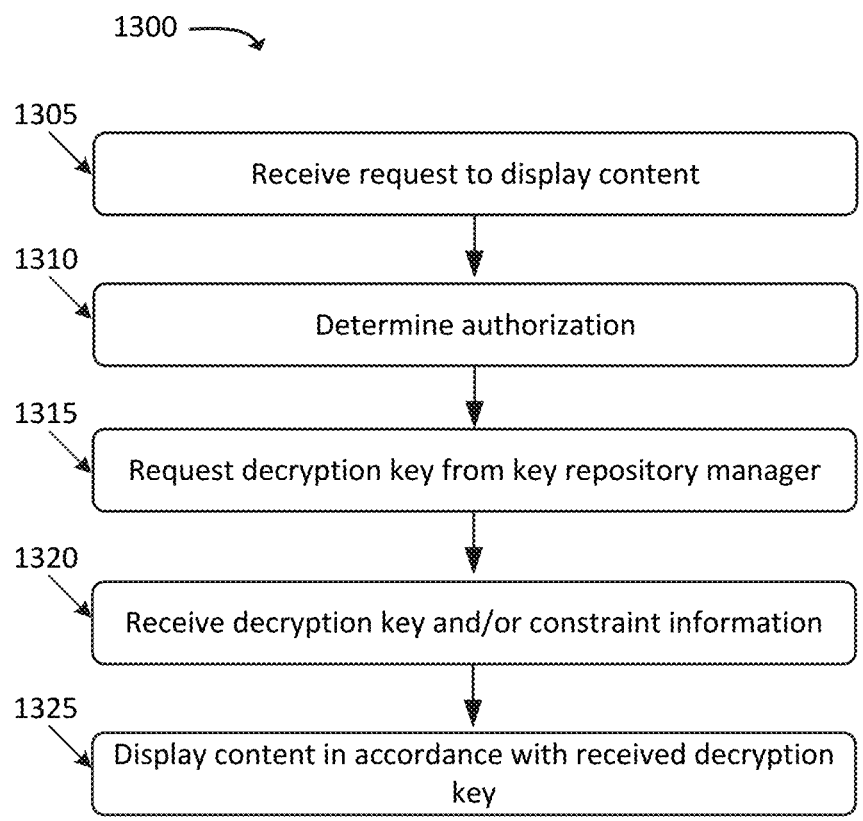
FIG. 13 illustrates an example process for authorizing a device to display content.

FIG. 13 illustrates an example process 1300 for authorizing a device to display content. In some embodiments, some or all of process 1300 may be performed by CDS 107. In some embodiments, one or more other devices may perform some or all of process 1300 (e.g., in concert with, and/or in lieu of, CDS 107).

Process 1300 may include receiving (at 1305) a request to display content. As described above, tenant profile information may indicate that CDS 107 may provide content to UE 105 and/or ITS 109. A user associated with UE 105 and/or ITS 107 may initiate a request to display content. In some embodiments, UE 105 and/or ITS 107 may initiate a request (e.g., auto-play feature, etc.).

Process 1300 may further include determining (at 1310) authorization to access content. Content may be limited according to tenant profile information. For example, as described above, a tenant profile may restrict access from display on ITS 109, thus restricting access to display on ITS 109. In other embodiments, UE 105 and/or ITS 109 may lack the credentials necessary to access information. For example, CDS 107 may restrict access to particular content based on login credentials associated with a third-party content provider (e.g., third-party service providers 117).

Process 1300 may additionally include requesting (at 1315) a decryption key from a key repository manager. A key repository manager may be associated with one or more third-party service provider(s) 117. A request for a decryption key may include information regarding the use of the key to access content (e.g., UE information, environment use, etc.).

Process 1300 may further include receiving (at 1320) a decryption key from the key repository manager. As described above, the decryption key may be provided by a third-party service provider 117. In some embodiments, the decryption key may contain additional constraints on the decryption of content. For example, a decryption key may expire after a certain amount of time (e.g., 4 hours, etc.), may limit use to when UE 105 is connected to a certain network (e.g., a LAN associated with environment 1000, etc.), and/or other constraints.

Process 1300 may include displaying (at 1325) content in accordance with the received decryption key. Displaying content may include decrypting content based on the received key. As discussed above, CDS 107 may block (e.g., not decrypt and display) content after if a decryption key constraint is not met (e.g., decryption key expires, not connected to network, etc.).

Figure 14:
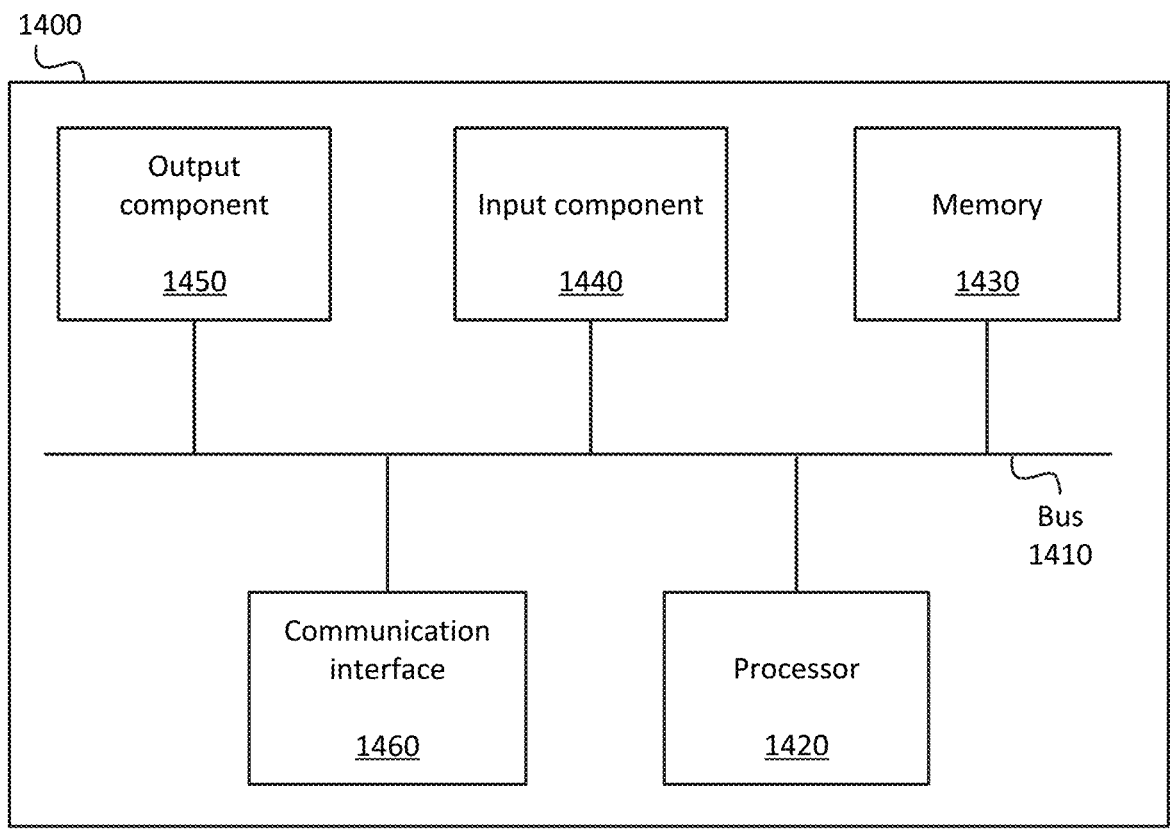
FIG. 14 illustrates example functional components of one or more devices, in accordance with one or more embodiments described herein.

FIG. 14 illustrates example components of device 1400. One or more of the devices described above may include one or more devices 1400. Device 1400 may include bus 1410, processor 1420, memory 1430, input component 1440, output component 1450, and communication interface 1460. In another implementation, device 1400 may include additional, fewer, different, or differently arranged components.

Bus 1410 may include one or more communication paths that permit communication among the components of device 1400. Processor 1420 may include a processor, microprocessor, or processing logic that may interpret and execute instructions. Memory 1430 may include any type of dynamic storage device that may store information and instructions for execution by processor 1420, and/or any type of non-volatile storage device that may store information for use by processor 1420.

Input component 1440 may include a mechanism that permits an operator to input information to device 1400, such as a keyboard, a keypad, a button, a switch, etc. Output component 1450 may include a mechanism that outputs information to the operator, such as a display, a speaker, one or more light emitting diodes ("LEDs"), etc.

Communication interface 1460 may include any transceiver-like mechanism that enables device 1400 to communicate with other devices and/or systems. For example, communication interface 1460 may include an Ethernet interface, an optical interface, a coaxial interface, or the like. Communication interface 1460 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1400 may include more than one communication interface 1460. For instance, device 1400 may include an optical interface and an Ethernet interface.

Device 1400 may perform certain operations relating to one or more processes described above. Device 1400 may perform these operations in response to processor 1420 executing software instructions stored in a computer-readable medium, such as memory 1430. A computer-readable medium may be defined as a non-transitory memory device. A memory device may include space within a single physical memory device or spread across multiple physical memory devices. The software instructions may be read into memory 1430 from another computer-readable medium or from another device. The software instructions stored in memory 1430 may cause processor 1420 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1, 2A, 2B, 11, 12, and 13), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
a non-transitory computer-readable medium storing a set of processor-executable instructions; and
one or more processors configured to execute the set of processor-executable instructions, wherein executing the set of processor-executable instructions causes the one or more processors to:
maintain, for a plurality of tenants associated with a multi-tenant environment, a registry of information, wherein the registry of information contains, for each tenant, of the plurality of tenants:

a profile associated with each tenant, and
a predictive model associated with each tenant;
receive sensor information regarding usage of the multi-tenant environment;
determine schedule information associated with the multi-tenant environment, wherein determining the schedule information includes:
utilizing natural language processing to analyze a first information source to determine the schedule information associated with the multi-tenant environment;
determining, based on the utilization of natural language processing, that the schedule information determined by analyzing the first information source is incomplete;
determining, based on determining that the schedule information is incomplete, a second information source; and
utilizing natural language processing to analyze the second information source to determine the schedule information;
score each predictive model associated with each tenant, of the plurality of tenants, for similarity to at least one of:
the received sensor information, or
the determined schedule information;
select, based on the score associated with each predictive model, a tenant, wherein the score associated with the selected tenant is most similar to the received sensor and/or schedule information;
determine, from the registry of information, the profile associated with the selected tenant;
identify content associated with the selected tenant;
present, via the multi-tenant environment, at least some of the identified content associated with the selected tenant;
receive selection feedback regarding the selection of the selected tenant; and
refine, based on the received feedback, the predictive model associated with the selected tenant.

2. The device of claim 1, wherein executing the processor-executable instructions, to provide the content, further causes the one or more processors to render, based on the set of tenant preferences, the content via one or more devices integrated within the multi-tenant environment.

3. The device of claim 1, wherein executing the processor-executable instructions, to present the content, further causes the one or more processors to:
identify one or more content presentation preferences associated with the selected tenant; and
present the content in accordance with the one or more content presentation preferences.

4. The device of claim 1, wherein maintaining the registry of tenants includes, for at least one tenant, updating at least one of:
a set of preferences associated with the at least one tenant, or
a set of permissions associated with the at least one tenant.

5. Device of claim 1, wherein the selected tenant is a first tenant, wherein the selection feedback includes a selection of a different second tenant within a threshold period of time after the first tenant is selected, and
wherein the refinement of the predictive model associated with the first tenant includes disassociating the first tenant with the received sensor information.

6. A non-transitory computer-readable medium, storing a plurality of processor-executable instructions to:
maintain, for a plurality of tenants associated with a multi-tenant environment, a registry of information, wherein the registry of information contains, for each tenant, of the plurality of tenants:
a profile associated with each tenant, and
a predictive model associated with each tenant;
receive sensor information regarding usage of the multi-tenant environment;
determine schedule information associated with the multi-tenant environment, wherein determining the schedule information includes:
utilizing natural language processing to analyze a first information source to determine the schedule information associated with the multi-tenant environment;
determining, based on the utilization of natural language processing, that the schedule information determined by analyzing the first information source is incomplete;
determining, based on determining that the schedule information is incomplete, a second information source; and
utilizing natural language processing to analyze the second information source to determine the schedule information;
score each predictive model associated with each tenant, of the plurality of tenants, for similarity to at least one of:
the received sensor information, or
the determined schedule information;
select, based on the score associated with each predictive model, a tenant, wherein the score associated with the selected tenant is most similar to the received sensor and/or schedule information;
determine, from the registry of information, the profile associated with the selected tenant;
identify content associated with the selected tenant;
present, via the multi-tenant environment, at least some of the identified content associated with the selected tenant;
receive selection feedback regarding the selection of the selected tenant; and
refine, based on the received feedback, the predictive model associated with the selected tenant.

7. The non-transitory computer-readable medium of claim 6, wherein the processor-executable instructions, to provide the content, further include processor-executable instructions to render, based on the set of tenant preferences, the content via one or more devices integrated within the multi-tenant environment.

8. The non-transitory computer-readable medium of claim 6, wherein the processor-executable instructions, to present the content, further include processor-executable instructions to:
identify one or more content presentation preferences associated with the selected tenant; and
present the content in accordance with the one or more content presentation preferences.

9. The non-transitory computer-readable medium of claim 6, wherein the processor-executable instructions, to maintain the registry of tenants, includes processor-executable instructions to, for at least one tenant, update at least one of:
a set of preferences associated with the at least one tenant, or
a set of permissions associated with the at least one tenant.

10. The non-transitory computer-readable medium of claim 6, wherein the selected tenant is a first tenant, wherein the selection feedback includes a selection of a different second tenant within a threshold period of time after the first tenant is selected, and
   wherein the refinement of the predictive model associated with the first tenant includes disassociating the first tenant with the received sensor information.

11. A method, comprising:
   maintaining, for a plurality of tenants associated with a multi-tenant environment, a registry of information, wherein the registry of information contains, for each tenant, of the plurality of tenants:
      a profile associated with each tenant, and
      a predictive model associated with each tenant;
   receiving sensor information regarding usage of the multi-tenant environment;
   determining schedule information associated with the multi-tenant environment, wherein determining the schedule information includes:
      utilizing natural language processing to analyze a first information source to determine the schedule information associated with the multi-tenant environment;
      determining, based on the utilization of natural language processing, that the schedule information determined by analyzing the first information source is incomplete;
      determining, based on determining that the schedule information is incomplete, a second information source; and
      utilizing natural language processing to analyze the second information source to determine the schedule information;
   scoring each predictive model associated with each tenant, of the plurality of tenants, for similarity to at least one of:
      the received sensor information, or
      the determined schedule information;
   selecting, based on the score associated with each predictive model, a tenant, wherein the score associated with the selected tenant is most similar to the received sensor and/or schedule information;
   determining, from the registry of information, the profile associated with the selected tenant;
   identifying content associated with the selected tenant;
   presenting, via the multi-tenant environment, at least some of the identified content associated with the selected tenant;
   receiving selection feedback regarding the selection of the selected tenant; and
   refining, based on the received feedback, the predictive model associated with the selected tenant.

12. The method of claim 11, wherein providing the content includes rendering, based on the set of tenant preferences, the content via one or more devices integrated within the multi-tenant environment.

13. The method of claim 11, wherein presenting the content includes:
   identifying one or more content presentation preferences associated with the selected tenant; and
   presenting the content in accordance with the one or more content presentation preferences.

14. The method of claim 11, wherein maintaining the registry of tenants includes, for at least one tenant, updating at least one of:
   a set of preferences associated with the at least one tenant, or
   a set of permissions associated with the at least one tenant.

15. The method of claim 11, wherein the selected tenant is a first tenant, wherein the selection feedback includes a selection of a different second tenant within a threshold period of time after the first tenant is selected, and
   wherein the refinement of the predictive model associated with the first tenant includes disassociating the first tenant with the received sensor information.

16. The method of claim 11, wherein maintaining the registry of tenants includes updating at least one of:
   a set of preferences associated with at least one tenant, or
   a set of permissions associated with the at least one tenant.

* * * * *